US012804381B2

(12) United States Patent
Orcutt et al.

(10) Patent No.: US 12,804,381 B2
(45) Date of Patent: Nov. 17, 2026

(54) ADDING SECONDARY SERVICE PLANS TO A MOBILE PHONE USING REPROGRAMMABLE eSIM CARDS

(71) Applicant: Boost SubscriberCo L.L.C., Englewood, CO (US)

(72) Inventors: Jennings Maxwell Orcutt, Denver, CO (US); Chris Ergen, Englewood, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 445 days.

(21) Appl. No.: 18/300,245

(22) Filed: Apr. 13, 2023

(65) Prior Publication Data

US 2024/0349035 A1 Oct. 17, 2024

(51) Int. Cl.
*H04W 8/20* (2009.01)
*H04W 8/18* (2009.01)
*H04W 64/00* (2009.01)

(52) U.S. Cl.
CPC .......... *H04W 8/205* (2013.01); *H04W 8/183* (2013.01); *H04W 64/003* (2013.01)

(58) Field of Classification Search
CPC ... H04W 8/205; H04W 8/183; H04W 64/003; H04W 12/75
See application file for complete search history.

(56) References Cited

U.S. PATENT DOCUMENTS 9,164,159 B2 10/2015 Nath et al.
9,661,674 B2 5/2017 Su
9,781,685 B2 10/2017 Tsui et al.
9,794,403 B2 10/2017 Shi et al.
9,843,885 B2 * 12/2017 Yerrabommanahalli .................... H04W 68/005

(Continued)

FOREIGN PATENT DOCUMENTS

CN 105516890 A * 4/2016 ......... H04L 63/0815
CN 106231586 B * 2/2019 ............ H04W 8/183

(Continued)

OTHER PUBLICATIONS

"5G Network Evolution with AWS," Amazon Web Services, Inc., https://dl.awsstatic.com/whitepapers/5g-network-evolution-with-aws.pdf, Jul. 2020, 48 pages.

(Continued)

*Primary Examiner* — Edan Orgad
(74) *Attorney, Agent, or Firm* — Seed Intellectual Property Law Group LLP

(57) ABSTRACT

Methods and apparatuses for improving the privacy and security of wireless communications by leveraging electronic subscriber identity module (eSIM) profiles to enable number portability and the ability to transfer a secondary service plan from a first computing device to a second computing device are described. A second eSIM profile associated with a secondary service plan that depends on a primary service plan used by the first computing device may be transferred to the second computing device by displaying a QR code on a display screen of the first computing device or by sending an electronic message from the first computing device to the second computing device. The second eSIM profile may be automatically identified by the first mobile device based on a location of the second mobile device.

16 Claims, 14 Drawing Sheets

(56) References Cited

U.S. PATENT DOCUMENTS 10,021,544 B2 7/2018 Shi et al.
10,142,818 B2 11/2018 Miao et al.
10,178,646 B2 1/2019 Bosch et al.
10,206,095 B2 2/2019 Anslot et al.
10,230,571 B2 3/2019 Rangasamy et al.
10,278,123 B2 4/2019 Wang et al.
10,452,372 B2 10/2019 Lundberg et al.
10,476,671 B2 11/2019 Park et al.
10,484,892 B2 11/2019 Bellamkonda et al.
10,499,276 B2 12/2019 Chan et al.
10,499,376 B2 12/2019 Kim
10,656,929 B2 5/2020 Jamjoom et al.
10,715,978 B2* 7/2020 Alamartimo ...... H04M 1/72406
10,716,096 B2 7/2020 Yu et al.
10,812,377 B2 10/2020 Stammers et al.
10,886,976 B2 1/2021 Rajagopal et al.
10,904,038 B1 1/2021 Haque
10,944,668 B2 3/2021 Rajagopal et al.
10,986,540 B2 4/2021 Bor Yaliniz et al.
11,019,159 B2 5/2021 Lawson et al.
11,064,347 B1* 7/2021 Dreiling .............. H04W 12/043
11,128,985 B2 9/2021 Edge et al.
11,153,271 B2 10/2021 Yang et al.
11,206,701 B2 12/2021 Walia et al.
11,223,994 B2 1/2022 Yang et al.
11,228,621 B2 1/2022 Sharma et al.
11,240,063 B2 2/2022 Liu et al.
11,284,297 B2 3/2022 Barton et al.
11,357,067 B2 6/2022 Nimmala et al.
12,309,881 B2* 5/2025 Li ......................... H04W 8/183
2002/0170053 A1 11/2002 Peterka et al.
2015/0109976 A1 4/2015 Zhang et al.
2015/0189578 A1 7/2015 van der Laak
2017/0048645 A1* 2/2017 Yerrabommanahalli .................... H04W 68/005
2017/0079059 A1 3/2017 Li et al.
2018/0049015 A1 2/2018 Gupta et al.
2018/0307514 A1 10/2018 Koutyrine et al.
2019/0028884 A1* 1/2019 Namiranian ........... G06Q 30/04
2019/0098487 A1 3/2019 Boettger
2019/0098488 A1* 3/2019 Syed ..................... H04L 67/306
2019/0220703 A1 7/2019 Prakash et al.
2019/0253907 A1 8/2019 Yao et al.
2019/0289497 A1 9/2019 Rajagopal
2019/0306923 A1 10/2019 Xiong et al.
2019/0349429 A1 11/2019 Jain et al.
2020/0050494 A1 2/2020 Bartfai-Walcott et al.
2020/0106536 A1 4/2020 Bedekar
2020/0125389 A1 4/2020 Palermo et al.
2020/0195495 A1 6/2020 Parker et al.
2020/0359278 A1 11/2020 Dhanani et al.
2021/0014912 A1 1/2021 Song et al.
2021/0084485 A1* 3/2021 Roy ...................... H04W 12/35
2021/0144517 A1 5/2021 Guim Bernat et al.
2021/0144613 A1 5/2021 Colom Ikuno et al.
2021/0160937 A1* 5/2021 Khanduri ................ G06F 21/31
2021/0194821 A1 6/2021 Guim Bernat et al.
2021/0204162 A1 7/2021 Chunduri et al.
2021/0242893 A1 8/2021 Goodman et al.
2021/0258231 A1 8/2021 Venkataramu et al.
2021/0258836 A1 8/2021 Faccin et al.
2021/0306874 A1 9/2021 Bedekar
2021/0314842 A1 10/2021 Padlikar et al.
2021/0377116 A1 12/2021 Yeh et al.
2022/0035650 A1 2/2022 Banerjee et al.
2022/0070734 A1 3/2022 Rajagopal
2022/0116763 A1 4/2022 Bouskila et al.
2023/0081421 A1* 3/2023 Jin ........................ H04W 60/04 455/418
2023/0413036 A1* 12/2023 Chaugule .............. H04W 8/205
2024/0276203 A1* 8/2024 Nagarajan ............... H04W 8/20
2025/0016551 A1* 1/2025 Singh .................... H04W 8/183

FOREIGN PATENT DOCUMENTS

CN 121645207 A * 3/2026 ........ H04W 52/0261
EP 3 869 847 A1 8/2021
WO WO-2005103860 A1 * 11/2005 ........... G06F 1/1684
WO WO-2023228694 A1 * 11/2023 ............ H04W 8/183

OTHER PUBLICATIONS

"Deploying E2E 5G Network with AWS," Amazon Web Services, Inc., https://dl.awsstatic.com/architecture-diagrams/ArchitectureDiagrams/5g-with-aws-ra.pdf?did=wp_card&trk=wp_card, 2020, 1 page.
"Promoting the Deployment of 5G Open Radio Access Networks," 5G Americas, Nov. 2020, 60 pages.
"Continuous Integration and Continuous Delivery for 5G Networks on AWS," Amazon Web Services, Inc., https://docs.aws.amazon.com/whitepapers/latest/cicd_for_5g_networks_on_aws/cicd_for_5g_networks_on_aws.html, Mar. 8, 2021, 31 pages.
"Cloud Automation for 5G Network," Amazon Web Services, Inc., https://dl.awsstatic.com/whitepapers/cloud-automation-for-5g-network.pdf, Jun. 16, 2021, 22 pages.
Bye et al., "Reinventing cloud-native 5G networks," Amazon Web Services, Inc., https://www.fcc.gov/file/21588/download, 2021, 11 pages.
"Next-Generation Mobile Private Networks Powered by AWS," Amazon Web Services, Inc., https://docs.aws.amazon.com/whitepapers/latest/mobile-private-networks/mobile-private-network-components.html, Jan. 27, 2021, 29 pages.
"DISH lays the foundation for 5G network security," Dish Wireless, https://mma.prnewswire.com/media/1483423/Security_Whitepaper_CLEAN.pdf?p=original, Apr. 8, 2021, 12 pages.
"Future of the Connected Vehicle," Dish Wireless, https://www.dishwireless.com/content/dam/pdfs/wi-whitepaper-connectedcar.pdf, Jan. 6, 2022, 22 pages.
Maule et al., "Real-time Dynamic Network Slicing for the 5G Radio Access Network," Iquadrat Informatica S.L., https://ieeexplore.ieee.org/document/9013965, Dec. 9-13, 2019, 6 pages.
"Amazon EC2 Overview and Networking Introduction for Telecom Companies," Amazon Web Services, Inc., https://dl.awsstatic.com/whitepapers/amazon-ec2-networking-for-telecom.pdf, Sep. 2019, 27 pages.

* cited by examiner

| | Transferable eSIMs | Mobile Number | Call Limit | Time Limit | Data Limit | Renewable |
|---|---|---|---|---|---|---|
| 322 | SUPI = 310 … 001234 | (650) 123-4567 | 1 | - | - | No |
| 323 | SUPI = 310 … 001235 | (650) 123-9876 | 5 | 30 min | - | No |
| | ⋮ | ⋮ | ⋮ | ⋮ | ⋮ | ⋮ |
| 324 | SUPI = 312 … 075678 | (206) 585-5951 | 10 | 120 min | 1 GB | Yes |
| 325 | Open slot | | | | | |

ADDING SECONDARY SERVICE PLANS TO A MOBILE PHONE USING REPROGRAMMABLE eSIM CARDS

BACKGROUND

Next generation wireless networks have the promise to provide higher throughput, lower latency, and higher availability compared with previous wireless communication standards. For fifth generation (5G) wireless networks, a combination of control and user plane separation (CUPS) and multi-access edge computing (MEC), which allows compute and storage resources to be moved from a centralized cloud location to the "edge" of a network and closer to end user devices and equipment, has enabled low-latency applications with millisecond response times. 5G wireless user equipment (UE) may communicate over both a lower frequency sub-6 GHz band between 410 MHz and 7125 MHz and a higher frequency mmWave band between 24.25 GHZ and 52.6 GHZ. In general, although lower frequencies may provide a lower maximum bandwidth and lower data rates than higher frequencies, lower frequencies may provide higher spectral efficiency and greater range. Thus, there is a tradeoff between coverage and speed. For example, although the mmWave spectrum may provide higher data rates, the millimeter waves may not penetrate through objects, such as walls, and may have a more limited range.

BRIEF SUMMARY

Systems and methods for improving the privacy and security of wireless network connections to wireless networks by intelligently managing electronic subscriber identity module (eSIM) profiles are provided. A first computing device (e.g., a mobile phone) may transfer temporary cell service or a secondary service plan to a second computing device via the transfer of an eSIM profile associated with the secondary service plan. The secondary service plan may link to or depend on a primary service plan used by the first computing device.

In some embodiments, the first computing device may be configured to detect that an eSIM profile associated with a secondary service plan that depends on a primary service plan used by the first computing device should be transferred to the second computing device, determine a location of the second computing device, identify the eSIM profile from a plurality of eSIM profiles based on the location of the second computing device, and cause the eSIM profile to be transferred to the second computing device. In one example, the first computing device may cause the eSIM profile to be transferred to the second computing device via display or electronic transfer of a QR code. The QR code may comprises a dynamic QR code that directs the second computing device to a web address to download the eSIM profile associated with the secondary service plan. Each profile of the plurality of eSIM profiles may have been previously registered with a wireless network prior to identification or selection of the eSIM profile from the plurality of eSIM profiles. Each profile of the plurality of eSIM profiles may enable temporary use of the primary service plan for a particular period of time.

In some embodiments, a first computing device may automatically preload an eSIM profile associated with a temporary service plan prior to making a phone call to a particular phone number. The first computing device may identify or select the eSIM profile to be loaded into an embedded universal integrated circuit card (eUICC) of the first computing device in response to detection that a call from a new or unknown phone number has been received at the first computing device or that a call to a new or unknown phone number has been initiated by an end user of the first computing device. The first computing device may identify the eSIM profile from a pool of eSIM profiles based on a location of the first computing device.

According to some embodiments, the technical benefits of the systems and methods disclosed herein include improved privacy and security with wireless network connections, improved system performance, reduced system power and energy consumption, and a reduction in the time required to establish wireless network connections.

BRIEF DESCRIPTION OF THE DRAWINGS

Like-numbered elements may refer to common components in the different figures.

DETAILED DESCRIPTION

Figure 1A:
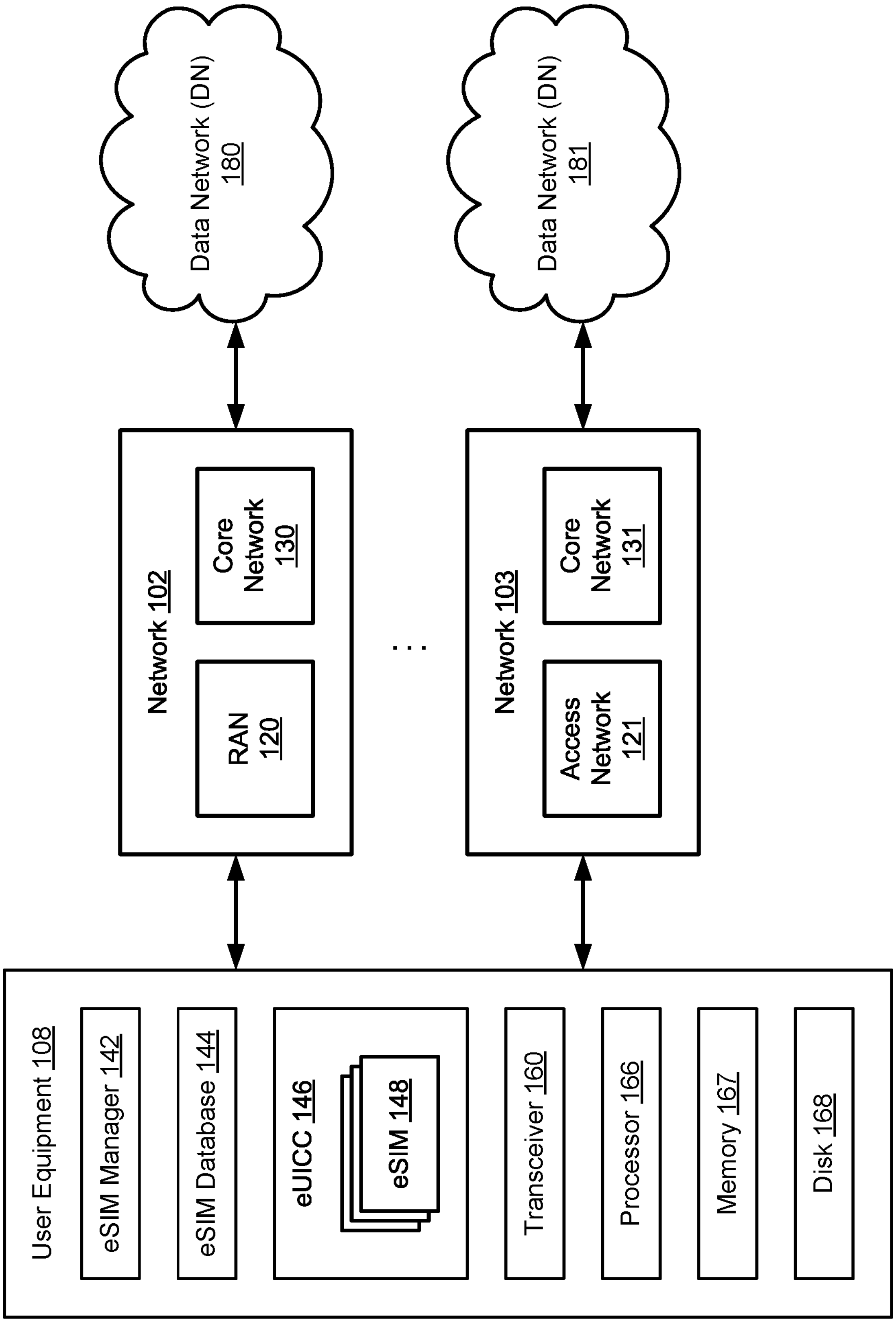
FIG. 1A depicts one embodiment of user equipment that is in communication with one or more wireless networks.

Technology is described for improving the privacy and security of wireless communications by leveraging electronic subscriber identity module (eSIM) profiles to enable number portability and the ability to transfer temporary cell service or a secondary service plan from a first computing device (e.g., a parent's mobile device) to a second computing device (e.g., a child's mobile device). In some cases, a second eSIM profile associated with a secondary service plan that depends on a primary service plan used by the first computing device may be transferred to the second computing device by displaying a QR code on a display screen of the first computing device or by sending an electronic message (e.g., a text message that includes the second eSIM profile) from the first computing device to the second computing device. The QR code may comprise a one-time QR code or a dynamic QR code that directs the second computing device to a web address to download the second eSIM profile associated with the secondary service plan. In some cases, a secondary service plan may depend on or derive from a primary service plan if the secondary service plan cannot provide cell service beyond the limitations of the primary service plan and cell service using the secondary service plan is covered by the primary service plan. The secondary service plan may link to or rely on the primary service plan for cellular service.

In some embodiments, a first mobile device (e.g., a mobile phone) may use a first eSIM profile associated with a first service plan to connect to a first wireless network. The first service plan may comprise a primary service plan. The first mobile phone may cause a second eSIM profile to be generated that is associated with a secondary service plan that depends on the first service plan for service. In some cases, the first mobile device may generate the second eSIM profile using circuitry located within the first mobile device and cause the second eSIM profile to be transferred to a second mobile device. In other cases, a home subscriber server or a cellular service subscription server for the first wireless network may generate the second eSIM profile and allow the second eSIM profile to be transferred to a second mobile device (e.g., via a website download of the second eSIM profile). The second eSIM profile may be automatically identified by the first mobile device based on a location of the second mobile device. In one example, the second eSIM profile may utilize a phone number that has an area code that corresponds with a location of the second mobile device.

In another example, the second eSIM profile may correspond with a wireless network that has a coverage area that corresponds with a location of the second mobile device. Using the second eSIM profile when a coverage area of the second eSIM profile corresponds with the location of the second mobile device means that the second mobile device will be able to immediately make calls from the location using the second eSIM profile. A technical benefit of using an eSIM profile with cell coverage near and at the location of the second mobile device is that wireless network availability and voice call quality may be maintained or improved.

The transfer of the second eSIM profile to the second mobile device allows temporary cell service that relies on an existing primary service plan to be transferred to the second mobile device. In one example, a second person may be visiting from a different country and their cell phone may not have access to a service plan that is configured for the visited country. In this case, a first person with a first cell phone that has an existing primary service plan for cell service within the visited country may cause a temporary eSIM profile to be generated or identified that allows temporary use of the existing primary service plan for a particular period of time (e.g., for the next ten days) or until a cell service usage metric has been satisfied (e.g., until a time usage threshold or a data usage threshold has been reached) by the second person's cell phone.

In some embodiments, the second eSIM profile to be transferred to the second mobile device may be selected from a pool of eSIM profiles that were previously registered with the first wireless network. For example, a pool of fifty eSIM profiles associated with secondary service plans that depend upon a primary service plan may be preregistered with the first wireless network and stored within an eSIM database. The second eSIM profile may be selected from the pool of eSIM profiles based on a location of the second mobile device, a limit to the number of calls that may be made, a limit to the amount of time that the secondary service plan may be used by the second mobile device, and/or a limit to the amount of data that may be consumed by the second mobile device when using the secondary service plan. In one example, the second eSIM profile may be selected based on a geographical location of the second mobile device (e.g., the second mobile device may be selected as being within a coverage area for cell service provided by the second eSIM profile).

Technical benefits of identifying and utilizing eSIM profiles associated with secondary service plans that depend upon a primary service plan include an improved utilization of wireless network subscriptions and service plans and a reduction in the system power and energy consumed by mobile devices that utilize the secondary service plans.

In some embodiments, a mobile device may load an eSIM profile associated with a temporary service plan prior to making a phone call to a particular phone number. The mobile device may identify the eSIM profile to be loaded into an embedded universal integrated circuit card (eUICC) of the mobile device in response to detection that a call from a new or unknown phone number has been received at the mobile device. Before making a call to the new or unknown phone number, the mobile device may identify the eSIM profile from a pool of eSIM profiles based on a geographic location of the mobile device and the particular phone number to be called. In one example, a cell number associated with the eSIM profile may have the same area code as the particular phone number to be called. In use cases where a temporary phone number may be desired and the person being called with the temporary phone number may need to call back (e.g., when providing a phone number to a taxi service), the eSIM profile may correspond with a temporary service plan that is limited in the number of calls that may be made or limited based on time or data usage. In one example, the eSIM profile may allow the mobile device to make and/or receive up to five calls using a temporary phone number.

A wireless device (e.g., user equipment with wireless connectivity) may register for and access wireless services via a wireless network provided by a mobile network operator (MNO). Access to the wireless services (e.g., text messaging and cellular services) by the wireless device may be authorized based on service subscriptions that are controlled using credentials and network-specific information stored within a subscriber identity module (SIM) or an electronic subscriber identity module (eSIM) of the wireless device. An eSIM may comprise an electronic version of a physical SIM. An eSIM may correspond with an eSIM profile that stores subscription and network settings for establishing and maintaining a wireless network connection with a wireless network. A SIM (or eSIM) may securely store information that is required to authenticate and identify a subscriber associated with the SIM (or eSIM) to the wireless network.

A wireless device may utilize an embedded universal integrated circuit card (eUICC) to remotely configure, store and/or implement one or more eSIMs. The eUICC may be configured to implement or execute the one or more eSIMs over time. Each eSIM of the one or more eSIMs may correspond with an eSIM profile or a network operator profile that comprises software or executable instructions that may be loaded into the eUICC. Each eSIM of the one or more eSIMs may be associated with a unique subscriber identifier and/or may enable different wireless services for a particular subscriber associated with the eSIM. The particular subscriber may be associated with an end user of the wireless device. In one example, each eSIM may be assigned a unique subscriber identifier such as an International Mobile Subscriber Identity (IMSI) or a Subscription Permanent Identifier (SUPI). An IMSI may be used for subscriber identifications in third generation (3G) and fourth generation (4G) wireless networks and a SUPI may be used for subscriber identifications in 5G wireless networks. The unique subscriber identifier may include a mobile country code (MCC), a mobile network code (MNC), and a mobile station identification number (MSIN). Each eSIM may also store an encryption key to encrypt the unique subscriber identifier. For example, a SUPI may be encrypted to generate a Subscriber Concealed Identifier (SUCI) using the encryption key.

A wireless device may be registered with multiple subscriptions that correspond with multiple eSIMs at the same time. In some embodiments, the eUICC may concurrently implement or execute multiple eSIMs to enable multiple subscriber identities to be used by the same wireless device to access different wireless services including accessing different wireless networks that use different radio access technologies (RATs). For example, a wireless device may be configured to wirelessly communicate with various RATs, such as Global System for Mobile Communications (GSM) and Long Term Evolution (LTE). In some cases, the wireless device may include a plurality of transceivers for connecting to or communicating with different wireless networks at the same time.

During a registration procedure to register the wireless device and establish a connection with a wireless network, the wireless network may transfer credentials and network-specific information for an eSIM to the wireless device. The credentials and network-specific information may include a unique subscriber identifier (e.g., a SUPI), an encryption key for the unique subscriber identifier, and a Mobile Station International Subscriber Directory Number (MSISDN). The unique subscriber identifier may be used by the wireless network as a key for a home location register (HLR) or a subscriber database of registered wireless devices. The MSISDN may correspond with a cell number (or phone number) that is used for routing calls to the wireless device. In one example, the MSISDN may include a country code, national destination code, and subscriber number. In some cases, each eSIM may correspond with a unique subscriber identifier that is fixed during the lifetime of the eSIM while the MSISDN for the eSIM may be updated by the wireless network over time.

FIG. 1A depicts one embodiment of user equipment (UE) 108 that is communicating with a data network (DN) 180 via a wireless network 102 and communicating with a DN 181 via wireless network 103. In one example, the wireless network 102 may comprise a 5G wireless network and the wireless network 103 may comprise a 4G wireless network or a 3G wireless network. The data networks 180 and 181 may comprise portions of the Internet, a local area network (LAN), a wide area network (WAN), a private data network, a wireless network, a wired network, or a combination of networks. The UE 108 may comprise an electronic device with wireless connectivity or cellular communication capability, such as a mobile phone or handheld computing device. The UE 108 may comprise a mobile computing device (e.g., a smartphone) or a non-mobile computing device (e.g., a desktop computer). The network 102 includes a radio access network 120 and a core network 130. The network 103 includes an access network 121 and a core network 131.

As depicted in FIG. 1A, the UE 108 includes an eSIM manager 142, an eSIM database 144, an eUICC 146 that implements one or more eSIMs including eSIM 148, a transceiver 160, a processor 166, a memory 167, and a disk 168 all in communication with each other. Processor 166 allows the UE 108 to execute computer readable instructions stored in memory 167 in order to perform processes discussed herein. Processor 166 may include one or more processing units, such as one or more CPUs and/or one or more GPUs. Memory 167 may comprise one or more types of memory (e.g., RAM, SRAM, DRAM, ROM, EEPROM, or Flash). Memory 167 may comprise a hardware storage device or a semiconductor memory. The transceiver 160 may comprise wireless transmitter/receiver circuitry for transmitting and receiving wireless signals. The UE 108 may include wireless circuitry that provides radio frequency (RF) connectivity between the UE 108 and the wireless networks 102 and 103. The wireless circuitry may include a baseband processor and RF analog front-end circuitry. The baseband processor may perform lower layer function processing (e.g., for physical layers, medium access layers, or network layers). The eSIM database 144 may store one or more eSIMs that may be loaded onto the eUICC 146. The eSIM manager 142 may determine when an eSIM stored within the eSIM database 144 should be loaded onto the eUICC 146 and cause the eSIM to be transferred to the eUICC 146. The eSIM manager 142 may determine when an eSIM loaded onto the eUICC 146 should be removed or deleted from the eUICC 146 and cause the eSIM to be deleted from the eUICC 146.

The eUICC 146 may be used to securely store and execute one or more eSIM profiles. The eUICC 146 may include a memory not depicted in which the one or more eSIMs including eSIM 148 are stored. The eUICC 146 may also include a processor not depicted for implementing or executing the one or more eSIMs. Working together, the eSIM manager 142, eSIM database 144, and the eUICC 146 may enable the UE 108 to establish wireless connections with one or more wireless networks corresponding with the one or more eSIMs.

A wireless device that has the ability to connect to multiple wireless networks simultaneously using different subscriber identities may be referred to as a "multiple-SIM, multiple-active" (MSMA) wireless device. In some embodiments, the UE 108 may comprise a MSMA wireless device. In other embodiments, the UE 108 may comprise a single transmitter and one or more receivers. The UE 108 may register with a plurality of different wireless networks including network 102 and network 103. When the UE 108 is concurrently registered with two different wireless networks via two different eSIMs, the UE 108 may appear to the two different wireless networks as two distinct devices with different subscriber identifiers and subscriptions.

In some embodiments, the UE 108 may be concurrently registered with a plurality of different wireless network subscriptions corresponding with a plurality of eSIMs stored on the UE 108. The plurality of eSIMs may be stored within the eSIM database 144 and the eSIM manager 142 may selectively load eSIMS from the eSIM database 144 into the eUICC 146 for execution. A first eSIM of the plurality of eSIMs may be loaded into the eUICC 146 to enable the UE 108 to wirelessly connect to the DN 180 via network 102 and a second eSIM of the plurality of eSIMs may be loaded into the eUICC 146 to enable the UE 108 to wirelessly connect to the DN 181 via network 103. The UE 108 may establish a first protocol data unit (PDU) session to provide end-to-end connectivity between the UE 108 and the DN 180 using the first eSIM and establish a second PDU session to provide end-to-end connectivity between the UE 108 and the DN 181 using the second eSIM. In some cases, the UE 108 may wirelessly connect to the network 102 when the UE 108 is located within a first geographical region and may wirelessly connect to the network 103 when the UE 108 is located within a second geographical region different from the first geographical region.

Figure 1B:
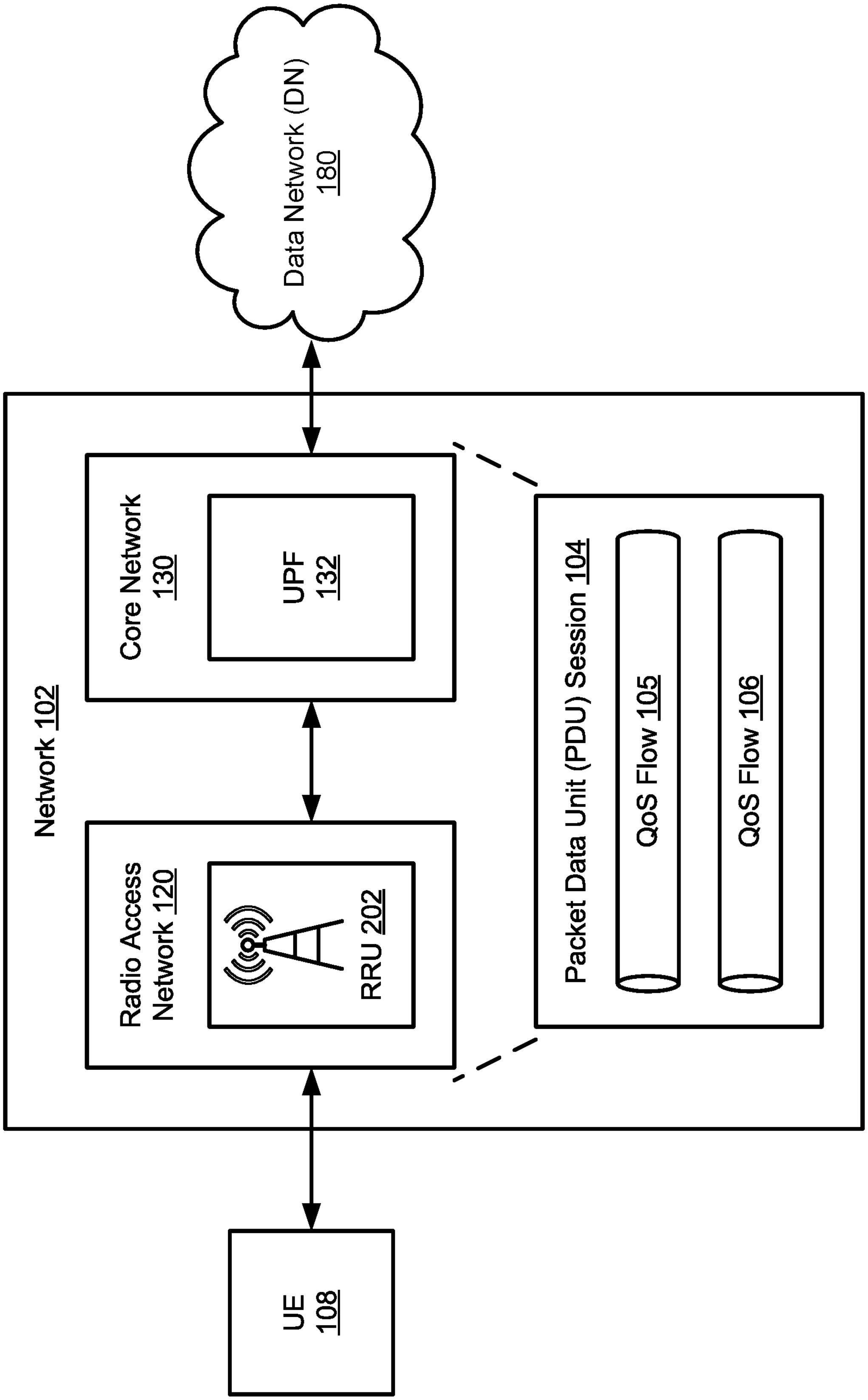
FIG. 1B depicts an embodiment of a network including a radio access network and a core network.

FIG. 1B depicts an embodiment of a network 102 including a radio access network (RAN) 120 and a core network 130. The network 102 may comprise a 5G wireless network. The radio access network 120 may comprise a new-generation radio access network (NG-RAN) that uses the 5G new radio interface (NR). The network 102 connects user equipment (UE) 108 to the data network (DN) 180 using the radio access network 120 and the core network 130. The data network 180 may comprise the Internet, a local area network (LAN), a wide area network (WAN), a private data network, a wireless network, a wired network, or a combination of networks. The UE 108 may comprise an electronic device with wireless connectivity or cellular communication capability, such as a mobile phone or handheld computing device. In at least one example, the UE 108 may comprise a 5G smartphone or a 5G cellular device that connects to the radio access network 120 via a wireless connection. The UE 108 may comprise one of a number of UEs not depicted that are in communication with the radio access network 120. The UEs may include mobile and non-mobile computing devices. The UEs may include laptop computers, desktop computers, an Internet-of-Things (IoT) devices, and/or any other electronic computing device that includes a wireless communications interface to access the radio access network 120.

The radio access network 120 includes a remote radio unit (RRU) 202 for wirelessly communicating with UE 108. The remote radio unit (RRU) 202 may comprise a radio unit (RU) and may include one or more radio transceivers for wirelessly communicating with UE 108. The remote radio unit (RRU) 202 may include circuitry for converting signals sent to and from an antenna of a base station into digital signals for transmission over packet networks. The radio access network 120 may correspond with a 5G radio base station that connects user equipment to the core network 130. The 5G radio base station may be referred to as a generation Node B, a "gNodeB," or a "gNB." A base station may refer to a network element that is responsible for the transmission and reception of radio signals in one or more cells to or from user equipment, such as UE 108.

The core network 130 may utilize a cloud-native service-based architecture (SBA) in which different core network functions (e.g., authentication, security, session management, and core access and mobility functions) are virtualized and implemented as loosely coupled independent services that communicate with each other, for example, using HTTP protocols and APIs. In some cases, control plane (CP) functions may interact with each other using the service-based architecture. In at least one embodiment, a microservices-based architecture in which software is composed of small independent services that communicate over well-defined APIs may be used for implementing some of the core network functions. For example, control plane (CP) network functions for performing session management may be implemented as containerized applications or microservices. Although a microservice-based architecture does not necessarily require a container-based implementation, a container-based implementation may offer improved scalability and availability over other approaches. Network functions that have been implemented using microservices may store their state information using the unstructured data storage function (UDSF) that supports data storage for stateless network functions across the service-based architecture (SBA).

The primary core network functions may comprise the access and mobility management function (AMF), the session management function (SMF), and the user plane function (UPF). The UPF (e.g., UPF 132) may perform packet processing including routing and forwarding, quality of service (QOS) handling, and packet data unit (PDU) session management. The UPF may serve as an ingress and egress point for user plane traffic and provide anchored mobility support for user equipment. For example, the UPF 132 may provide an anchor point between the UE 108 and the data network 180 as the UE 108 moves between coverage areas. The AMF may act as a single-entry point for a UE connection and perform mobility management, registration management, and connection management between a data network and UE. The SMF may perform session management, user plane selection, and IP address allocation.

Other core network functions may include a network repository function (NRF) for maintaining a list of available network functions and providing network function service registration and discovery, a policy control function (PCF) for enforcing policy rules for control plane functions, an authentication server function (AUSF) for authenticating user equipment and handling authentication related functionality, a network slice selection function (NSSF) for selecting network slice instances, and an application function (AF) for providing application services. Application-level session information may be exchanged between the AF and PCF (e.g., bandwidth requirements for QoS). In some cases, when user equipment requests access to resources, such as establishing a PDU session or a QoS flow, the PCF may dynamically decide if the user equipment should grant the requested access based on a location of the user equipment.

A network slice may comprise an independent end-to-end logical communications network that includes a set of logically separated virtual network functions. Network slicing may allow different logical networks or network slices to be implemented using the same compute and storage infrastructure. Therefore, network slicing may allow heterogeneous services to coexist within the same network architecture via allocation of network computing, storage, and communication resources among active services. In some cases, the network slices may be dynamically created and adjusted over time based on network requirements. For example, some networks may require ultra-low-latency or ultra-reliable services. To meet ultra-low-latency requirements, components of the radio access network 120, such as a distributed unit (DU) and a centralized unit (CU), may need to be deployed at a cell site or in a local data center (LDC) that is in close proximity to a cell site such that the latency requirements are satisfied (e.g., such that the one-way latency from the cell site to the DU component or CU component is less than 1.2 ms).

In some embodiments, the distributed unit (DU) and the centralized unit (CU) of the radio access network 120 may be co-located with the remote radio unit (RRU) 202. In other embodiments, the distributed unit (DU) and the remote radio unit (RRU) 202 may be co-located at a cell site and the centralized unit (CU) may be located within a local data center (LDC).

The network 102 may provide one or more network slices, wherein each network slice may include a set of network functions that are selected to provide specific telecommunications services. For example, each network slice may comprise a configuration of network functions, network applications, and underlying cloud-based compute and storage infrastructure. In some cases, a network slice may correspond with a logical instantiation of a 5G network, such as an instantiation of the network 102. In some cases, the network 102 may support customized policy configuration and enforcement between network slices per service level agreements (SLAs) within the radio access network (RAN) 120. User equipment, such as UE 108, may connect to multiple network slices at the same time (e.g., eight different network slices). In one embodiment, a PDU session, such as PDU session 104, may belong to only one network slice instance.

In some cases, the network 102 may dynamically generate network slices to provide telecommunications services for various use cases, such the enhanced Mobile Broadband (eMBB), Ultra-Reliable and Low-Latency Communication (URLCC), and massive Machine Type Communication (mMTC) use cases.

A cloud-based compute and storage infrastructure may comprise a networked computing environment that provides a cloud computing environment. Cloud computing may refer to Internet-based computing, wherein shared resources, software, and/or information may be provided to one or more computing devices on-demand via the Internet (or other network). The term "cloud" may be used as a metaphor for the Internet, based on the cloud drawings used in computer networking diagrams to depict the Internet as an abstraction of the underlying infrastructure it represents.

The core network 130 may include a plurality of network elements that are configured to offer various data and telecommunications services to subscribers or end users of user equipment, such as UE 108. Examples of network elements include network computers, network processors, networking hardware, networking equipment, routers, switches, hubs, bridges, radio network controllers, gateways, servers, virtualized network functions, and network functions virtualization infrastructure. A network element may comprise a real or virtualized component that provides wired or wireless communication network services.

Virtualization allows virtual hardware to be created and decoupled from the underlying physical hardware. One example of a virtualized component is a virtual router (or a vRouter). Another example of a virtualized component is a virtual machine. A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored as a set of files including a virtual disk file for storing the contents of a virtual disk and a virtual machine configuration file for storing configuration settings for the virtual machine. The configuration settings may include the number of virtual processors (e.g., four virtual CPUs), the size of a virtual memory, and the size of a virtual disk (e.g., a 64 GB virtual disk) for the virtual machine. Another example of a virtualized component is a software container or an application container that encapsulates an application's environment.

In some embodiments, applications and services may be run using virtual machines instead of containers in order to improve security. A common virtual machine may also be used to run applications and/or containers for a number of closely related network services.

The network 102 may implement various network functions, such as the core network functions and radio access network functions, using a cloud-based compute and storage infrastructure. A network function may be implemented as a software instance running on hardware or as a virtualized network function. Virtual network functions (VNFs) may comprise implementations of network functions as software processes or applications. In at least one example, a virtual network function (VNF) may be implemented as a software process or application that is run using virtual machines (VMs) or application containers within the cloud-based compute and storage infrastructure. Application containers (or containers) allow applications to be bundled with their own libraries and configuration files, and then executed in isolation on a single operating system (OS) kernel. Application containerization may refer to an OS-level virtualization method that allows isolated applications to be run on a single host and access the same OS kernel. Containers may run on bare-metal systems, cloud instances, and virtual machines. Network functions virtualization may be used to virtualize network functions, for example, via virtual machines, containers, and/or virtual hardware that runs processor readable code or executable instructions stored in one or more computer-readable storage mediums (e.g., one or more data storage devices).

As depicted in FIG. 1B, the core network 130 includes a user plane function (UPF) 132 for transporting IP data traffic (e.g., user plane traffic) between the UE 108 and the data network 180 and for handling packet data unit (PDU) sessions with the data network 180. The UPF 132 may comprise an anchor point between the UE 108 and the data network 180. The UPF 132 may be implemented as a software process or application running within a virtualized infrastructure or a cloud-based compute and storage infrastructure. The network 102 may connect the UE 108 to the data network 180 using a packet data unit (PDU) session 104, which may comprise part of an overlay network.

The PDU session 104 may utilize one or more quality of service (QOS) flows, such as QoS flows 105 and 106, to exchange traffic (e.g., data and voice traffic) between the UE 108 and the data network 180. The one or more QoS flows may comprise the finest granularity of QoS differentiation within the PDU session 104. The PDU session 104 may belong to a network slice instance through the network 102. To establish user plane connectivity from the UE 108 to the data network 180, an AMF that supports the network slice instance may be selected and a PDU session via the network slice instance may be established. In some cases, the PDU session 104 may be of type IPv4 or IPv6 for transporting IP packets. The radio access network 120 may be configured to establish and release parts of the PDU session 104 that cross the radio interface.

The radio access network 120 may include a set of one or more remote radio units (RRUs) that includes radio transceivers (or combinations of radio transmitters and receivers) for wirelessly communicating with UEs. The set of RRUs may correspond with a network of cells (or coverage areas) that provide continuous or nearly continuous overlapping service to UEs, such as UE 108, over a geographic area. Some cells may correspond with stationary coverage areas and other cells may correspond with coverage areas that change over time (e.g., due to movement of a mobile RRU).

In some cases, the UE 108 may be capable of transmitting signals to and receiving signals from one or more RRUs within the network of cells over time. One or more cells may correspond with a cell site. The cells within the network of cells may be configured to facilitate communication between UE 108 and other UEs and/or between UE 108 and a data network, such as data network 180. The cells may include macrocells (e.g., capable of reaching 18 miles) and small cells, such as microcells (e.g., capable of reaching 1.2 miles), picocells (e.g., capable of reaching 0.12 miles), and femtocells (e.g., capable of reaching 32 feet). Small cells may communicate through macrocells. Although the range of small cells may be limited, small cells may enable mm Wave frequencies with high-speed connectivity to UEs within a short distance of the small cells. Macrocells may transit and receive radio signals using multiple-input multiple-output (MIMO) antennas that may be connected to a cell tower, an antenna mast, or a raised structure.

Referring to FIG. 1B, the UPF 132 may be responsible for routing and forwarding user plane packets between the radio access network 120 and the data network 180. Uplink packets arriving from the radio access network 120 may use a general packet radio service (GPRS) tunneling protocol (or GTP tunnel) to reach the UPF 132. The GPRS tunneling protocol for the user plane may support multiplexing of traffic from different PDU sessions by tunneling user data over the interface between the radio access network 120 and the UPF 132.

The UPF 132 may remove the packet headers belonging to the GTP tunnel before forwarding the user plane packets towards the data network 180. As the UPF 132 may provide connectivity towards other data networks in addition to the data network 180, the UPF 132 must ensure that the user plane packets are forwarded towards the correct data network. Each GTP tunnel may belong to a specific PDU session, such as PDU session 104. Each PDU session may be set up towards a specific data network name (DNN) that uniquely identifies the data network to which the user plane packets should be forwarded. The UPF 132 may keep a record of the mapping between the GTP tunnel, the PDU session, and the DNN for the data network to which the user plane packets are directed.

Downlink packets arriving from the data network 180 are mapped onto a specific QoS flow belonging to a specific PDU session before forwarded towards the appropriate radio access network 120. A QoS flow may correspond with a stream of data packets that have equal quality of service (Qos). A PDU session may have multiple QoS flows, such as the QoS flows 105 and 106 that belong to PDU session 104. The UPF 132 may use a set of service data flow (SDF) templates to map each downlink packet onto a specific QoS flow. The UPF 132 may receive the set of SDF templates from a session management function (SMF), such as the SMF 133 depicted in FIG. 1C, during setup of the PDU session 104. The SMF may generate the set of SDF templates using information provided from a policy control function (PCF). The UPF 132 may track various statistics regarding the volume of data transferred by each PDU session, such as PDU session 104, and provide the information to an SMF.

Figure 1C:
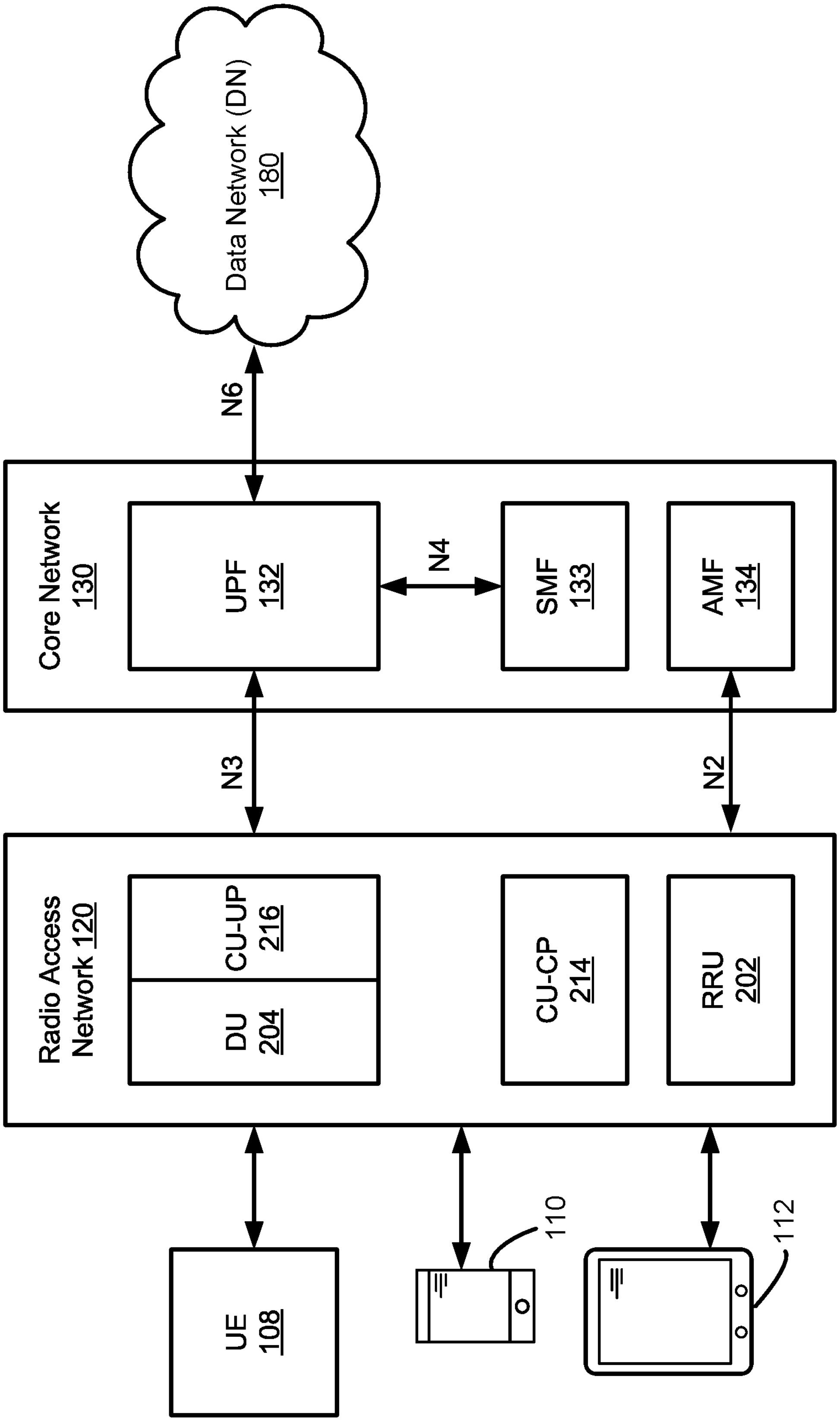
FIG. 1C depicts an embodiment of a radio access network and a core network for providing a communications channel between user equipment and data network.

FIG. 1C depicts an embodiment of a radio access network 120 and a core network 130 for providing a communications channel (or channel) between user equipment and data network 180. The communications channel may comprise a pathway through which data is communicated between the UE 108 and the data network 180. The user equipment in communication with the radio access network 120 includes UE 108, mobile phone 110, and mobile computing device 112. The user equipment may include a plurality of electronic devices, including mobile computing device and non-mobile computing device.

The core network 130 includes network functions such as an access and mobility management function (AMF) 134, a session management function (SMF) 133, and a user plane function (UPF) 132. The AMF may interface with user equipment and act as a single-entry point for a UE connection. The AMF may interface with the SMF to track user sessions. The AMF may interface with a network slice selection function (NSSF) not depicted to select network slice instances for user equipment, such as UE 108. When user equipment is leaving a first coverage area and entering a second coverage area, the AMF may be responsible for coordinating the handoff between the coverage areas whether the coverage areas are associated with the same radio access network or different radio access networks.

The UPF 132 may transfer downlink data received from the data network 180 to user equipment, such as UE 108, via the radio access network 120 and/or transfer uplink data received from user equipment to the data network 180 via the radio access network 180. An uplink may comprise a radio link though which user equipment transmits data and/or control signals to the radio access network 120. A downlink may comprise a radio link through which the radio access network 120 transmits data and/or control signals to the user equipment.

The radio access network 120 may be logically divided into a remote radio unit (RRU) 202, a distributed unit (DU) 204, and a centralized unit (CU) that is partitioned into a CU user plane portion CU-UP 216 and a CU control plane portion CU-CP 214. The CU-UP 216 may correspond with the centralized unit for the user plane and the CU-CP 214 may correspond with the centralized unit for the control plane. The CU-CP 214 may perform functions related to a control plane, such as connection setup, mobility, and security. The CU-UP 216 may perform functions related to a user plane, such as user data transmission and reception functions.

Decoupling control signaling in the control plane from user plane traffic in the user plane may allow the UPF 132 to be positioned in close proximity to the edge of a network compared with the AMF 134. As a closer geographic or topographic proximity may reduce the electrical distance, this means that the electrical distance from the UPF 132 to the UE 108 may be less than the electrical distance of the AMF 134 to the UE 108. The radio access network 120 may be connected to the AMF 134, which may allocate temporary unique identifiers, determine tracking areas, and select appropriate policy control functions (PCFs) for user equipment, via an N2 interface. The N3 interface may be used for transferring user data (e.g., user plane traffic) from the radio access network 120 to the user plane function UPF 132 and may be used for providing low-latency services using edge computing resources. The electrical distance from the UPF 132 (e.g., located at the edge of a network) to user equipment, such as UE 108, may impact the latency and performance services provided to the user equipment. The UE 108 may be connected to the SMF 133 via an N1 interface not depicted, which may transfer UE information directly to the AMF 134. The UPF 132 may be connected to the data network 180 via an N6 interface. The N6 interface may be used for providing connectivity between the UPF 132 and other external or internal data networks (e.g., to the Internet). The radio access network 120 may be connected to the SMF 133, which may manage UE context and network handovers between base stations, via the N2 interface. The N2 interface may be used for transferring control plane signaling between the radio access network 120 and the AMF 134.

The RRU 202 may perform physical layer functions, such as employing orthogonal frequency-division multiplexing (OFDM) for downlink data transmission. In some cases, the DU 204 may be located at a cell site (or a cellular base station) and may provide real-time support for lower layers of the protocol stack, such as the radio link control (RLC) layer and the medium access control (MAC) layer. The CU may provide support for higher layers of the protocol stack, such as the service data adaptation protocol (SDAP) layer, the packet data convergence control (PDCP) layer, and the radio resource control (RRC) layer. The SDAP layer may comprise the highest L2 sublayer in the 5G NR protocol stack. In some embodiments, a radio access network may correspond with a single CU that connects to multiple DUs (e.g., 10 DUs), and each DU may connect to multiple RRUs (e.g., 18 RRUs). In this case, a single CU may manage 10 different cell sites (or cellular base stations) and 180 different RRUs.

In some embodiments, the radio access network 120 or portions of the radio access network 120 may be implemented using multi-access edge computing (MEC) that allows computing and storage resources to be moved closer to user equipment. Allowing data to be processed and stored at the edge of a network that is located close to the user equipment may be necessary to satisfy low-latency application requirements. In at least one example, the DU 204 and CU-UP 216 may be executed as virtual instances within a data center environment that provides single-digit millisecond latencies (e.g., less than 2 ms) from the virtual instances to the UE 108.

Figure 1D:
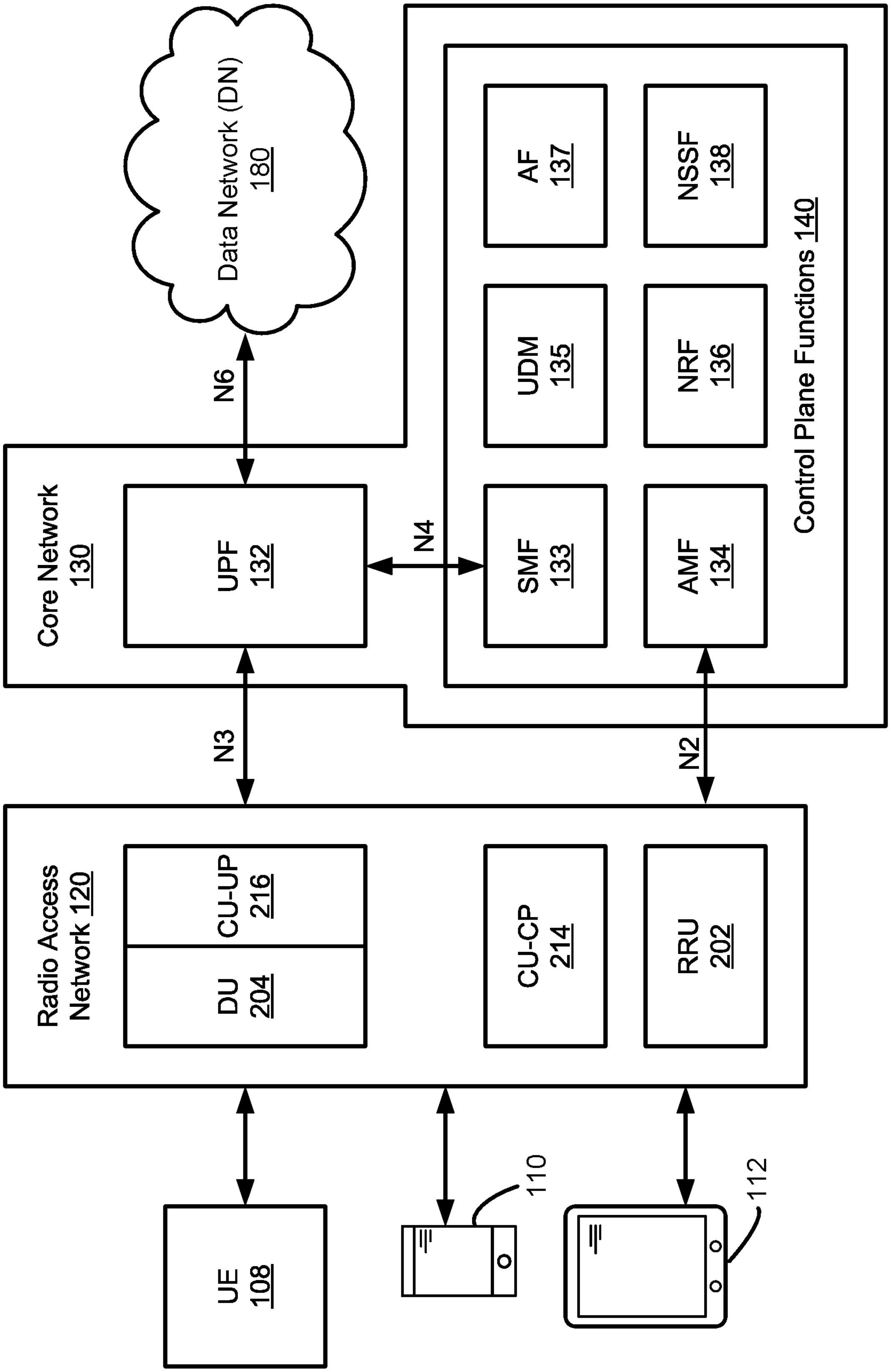
FIG. 1D depicts an embodiment of a radio access network and a core network for providing a communications channel between user equipment and data network.

FIG. 1D depicts an embodiment of a radio access network 120 and a core network 130 for providing a communications channel (or channel) between user equipment and data network 180. The core network 130 includes UPF 132 for handling user data in the core network 130. Data is transported between the radio access network 120 and the core network 130 via the N3 interface. The data may be tunneled across the N3 interface (e.g., IP routing may be done on the tunnel header IP address instead of using end user IP addresses). This may allow for maintaining a stable IP anchor point even though UE 108 may be moving around a network of cells or moving from one coverage area into another coverage area. The UPF 132 may connect to external data networks, such as the data network 180 via the N6 interface. The data may not be tunneled across the N6 interface as IP packets may be routed based on end user IP addresses. The UPF 132 may connect to the SMF 133 via the N4 interface.

As depicted, the core network 130 includes a group of control plane functions 140 comprising SMF 133, AMF 134, UDM 135, NRF 136, AF 137, and NSSF 138. The SMF 133 may configure or control the UPF 132 via the N4 interface. For example, the SMF 133 may control packet forwarding rules used by the UPF 132 and adjust QoS parameters for QoS enforcement of data flows (e.g., limiting available data rates). In some cases, multiple SMF/UPF pairs may be used to simultaneously manage user plane traffic for a particular user device, such as UE 108. For example, a set of SMFs may be associated with UE 108, wherein each SMF of the set of SMFs corresponds with a network slice. The SMF 133 may control the UPF 132 on a per end user data session basis, in which the SMF 133 may create, update, and remove session information in the UPF 132.

In some cases, the SMF 133 may select an appropriate UPF for a user plane path by querying the NRF 136 to identify a list of available UPFs and their corresponding capabilities and locations. The SMF 133 may select the UPF 132 based on a physical location of the UE 108 and a physical location of the UPF 132 (e.g., corresponding with a physical location of a data center in which the UPF 132 is running). The SMF 133 may also select the UPF 132 based on a particular network slice supported by the UPF 132 or based on a particular data network that is connected to the UPF 132. The ability to query the NRF 136 for UPF information eliminates the need for the SMF 133 to store and update the UPF information for every available UPF within the core network 130.

In some embodiments, the SMF 133 may query the NRF 136 to identify a set of available UPFs for a packet data unit (PDU) session and acquire UPF information from a variety of sources, such as the AMF 134 or the UE 108. The UPF information may include a location of the UPF 132, a location of the UE 108, the UPF's dynamic load, the UPF's static capacity among UPFs supporting the same data network, and the capability of the UPF 132.

The unified data management function (UDM) 135 may manage user registrations and network profiles. The UDM 135 may provide access and mobility subscription data to the AMF 134 during registration and provide subscriber information to the SMF 133 during the establishment of a PDU session. The UDM 135 may be paired with a user data repository (UDR) not depicted to store user data such as subscriber information, authentication information, and encryption keys. In some cases, the UDM 135 may correspond with a cloud-native implementation of the Home Subscriber Server (HSS) in 4G wireless networks. An authentication server function (AUSF) not depicted may provide the UDM 135 with either a SUPI or an encrypted SUCI based on the subscriber information.

The radio access network 120 may provide separation of the centralized unit for the control plane (CU-CP) 216 and the centralized unit for the user plane (CU-UP) 214 functionalities while supporting network slicing. The CU-CP 216 may obtain resource utilization and latency information from the DU 204 and/or the CU-UP 216, and select a CU-UP to pair with the DU 204 based on the resource utilization and latency information in order to configure a network slice. Network slice configuration information associated with the network slice may be provided to the UE 108 for purposes of initiating communication with the UPF 132 using the network slice.

Figure 2A:
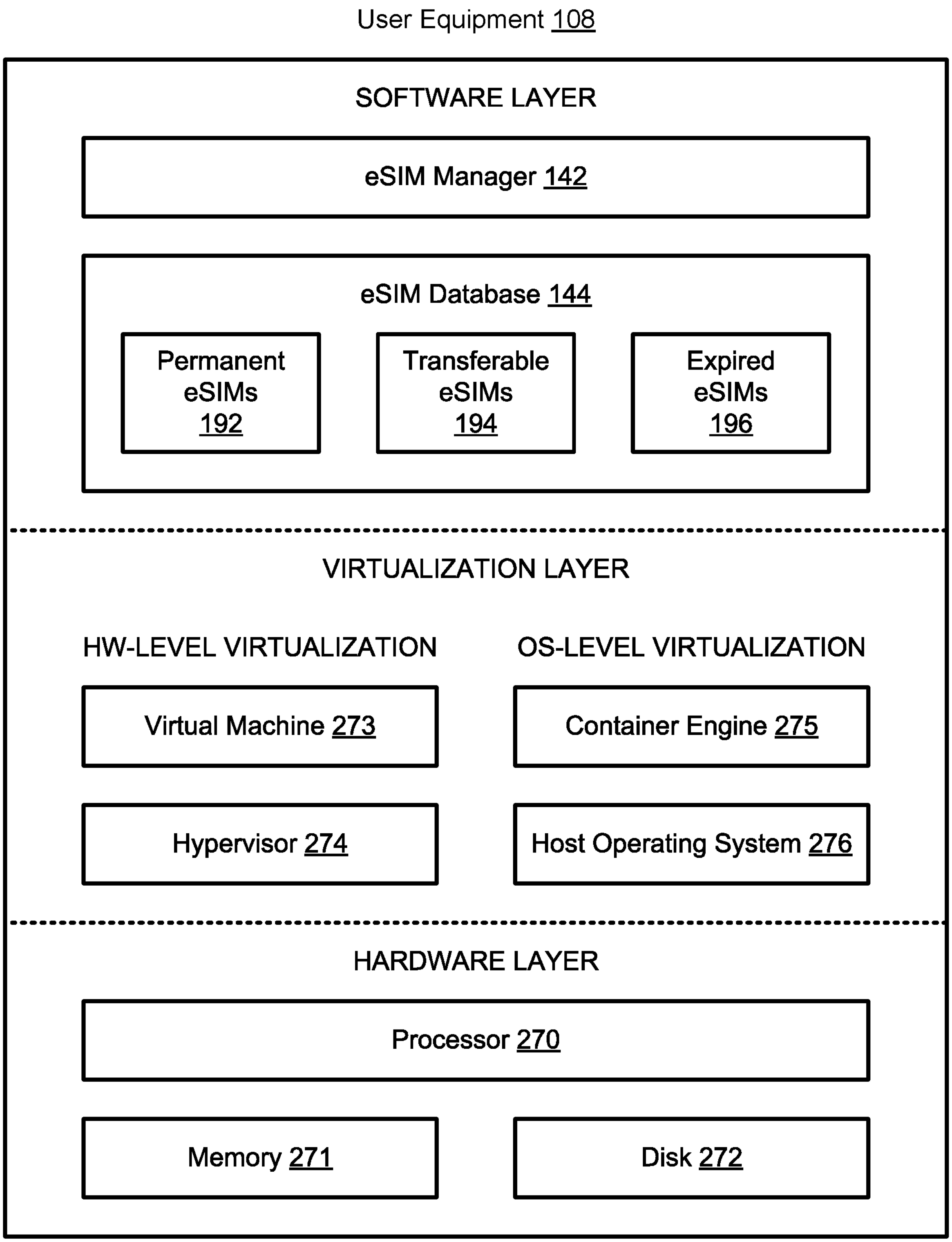
FIG. 2A depicts one embodiment of user equipment.

FIG. 2A depicts one embodiment of user equipment 108. As depicted, the user equipment 108 includes hardware-level components and software-level components. The hardware-level components include one or more processors 270, one or more memory 271, and one or more disks 272. The software-level components include software applications, such as the eSIM manager 142 and eSIM database 144. The eSIM database 144 may store eSIM profiles. The eSIM profiles may correspond with permanent eSIMs 192 or transferable eSIMs 194. Permanent eSIMs 192 may comprise eSIMs that are associated with persistent registrations or registrations that do not require a renewal to be reactivated. The permanent eSIMs 192 may comprise eSIMs that may not be transferred to another computing device to establish a wireless network connection or that are only valid when executed by user equipment 108. In some cases, the transferable eSIMs 194 may comprise eSIMs that expire after a specified number of calls, a specified amount of usage time, and/or a specified amount of usage data has been exceeded. For example, a transferable eSIM may expire after ten calls have been made using an MSISDN assigned to the transferable eSIM. After a transferable eSIM has expired and is no longer capable of establishing an active wireless connection, the transferable eSIM may be removed from a pool of active transferable eSIMs 194 and placed into a pool of expired eSIMs 196.

The software-level components may be run using the hardware-level components or executed using processor and storage components of the hardware-level components. For example, one or more of the software-level components may be executed or run using the processor 270, memory 271, and disk 272. In another example, one or more of the software-level components may be executed or run using a virtual processor and a virtual memory that are themselves executed or generated using the processor 270, memory 271, and disk 272.

The software-level components also include virtualization layer processes, such as virtual machine 273, hypervisor 274, container engine 275, and host operating system 276. The hypervisor 274 may comprise a native hypervisor (or bare-metal hypervisor) or a hosted hypervisor (or type 2 hypervisor). The hypervisor 274 may provide a virtual operating platform for running one or more virtual machines, such as virtual machine 273. A hypervisor may comprise software that creates and runs virtual machine instances. Virtual machine 273 may include a plurality of virtual hardware devices, such as a virtual processor, a virtual memory, and a virtual disk. The virtual machine 273 may include a guest operating system that has the capability to run one or more software applications, such as the eSIM manager 142. The virtual machine 273 may run the host operation system 276 upon which the container engine 275 may run. A virtual machine, such as virtual machine 273, may include one or more virtual processors.

A container engine 275 may run on top of the host operating system 276 in order to run multiple isolated instances (or containers) on the same operating system kernel of the host operating system 276. Containers may perform virtualization at the operating system level and may provide a virtualized environment for running applications and their dependencies. The container engine 275 may acquire a container image and convert the container image into running processes. In some cases, the container engine 275 may group containers that make up an application into logical units (or pods). A pod may contain one or more containers and all containers in a pod may run on the same node in a cluster. Each pod may serve as a deployment unit for the cluster. Each pod may run a single instance of an application.

In order to scale an application horizontally, multiple instances of a pod may be run in parallel. A "replica" may refer to a unit of replication employed by a computing platform to provision or deprovision resources. Some computing platforms may run containers directly and therefore a container may comprise the unit of replication. Other computing platforms may wrap one or more containers into a pod and therefore a pod may comprise the unit of replication.

In some embodiments, a virtualized infrastructure manager not depicted may be used to provide a centralized platform for managing a virtualized infrastructure for deploying various components of the user equipment 108. The virtualized infrastructure manager may manage the provisioning of virtual machines, containers, and pods. The virtualized infrastructure manager may also manage a replication controller responsible for managing a number of pods. In some cases, the virtualized infrastructure manager may perform various virtualized infrastructure related tasks, such as cloning virtual machines, creating new virtual machines, monitoring the state of virtual machines, and facilitating backups of virtual machines.

Figure 2B:
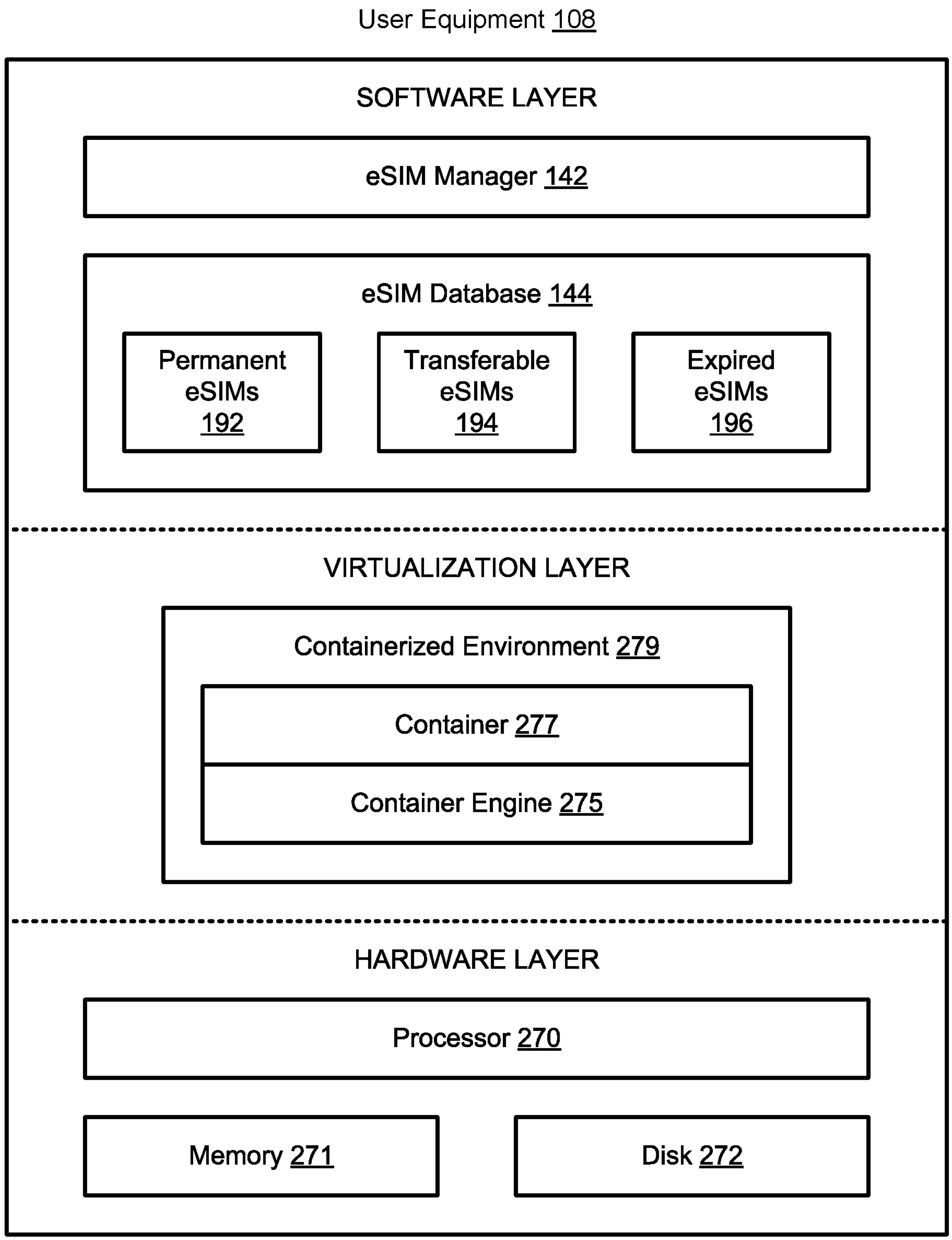
FIG. 2B depicts an embodiment of the user equipment of FIG. 2A in which the virtualization layer includes a containerized environment.

FIG. 2B depicts an embodiment of the user equipment 108 of FIG. 2A in which the virtualization layer includes a containerized environment 279. The containerized environment 279 includes a container engine 275 for instantiating and managing application containers, such as container 277. Containerized applications may comprise applications that run in isolated runtime environments (or containers). The containerized environment 279 may include a container orchestration service for automating the deployments of containerized applications. The container 277 may be used to deploy various microservices corresponding with processes executed by the user equipment 108. The containerized environment 279 may be executed using hardware-level components or executed using processor and storage components of the hardware-level components. In one example, the containerized environment 279 may be run using the processor 270, memory 271, and disk 272. In another example, the containerized environment 279 may be run using a virtual processor and a virtual memory that are themselves executed or generated using the processor 270, memory 271, and disk 272.

Figure 2C:
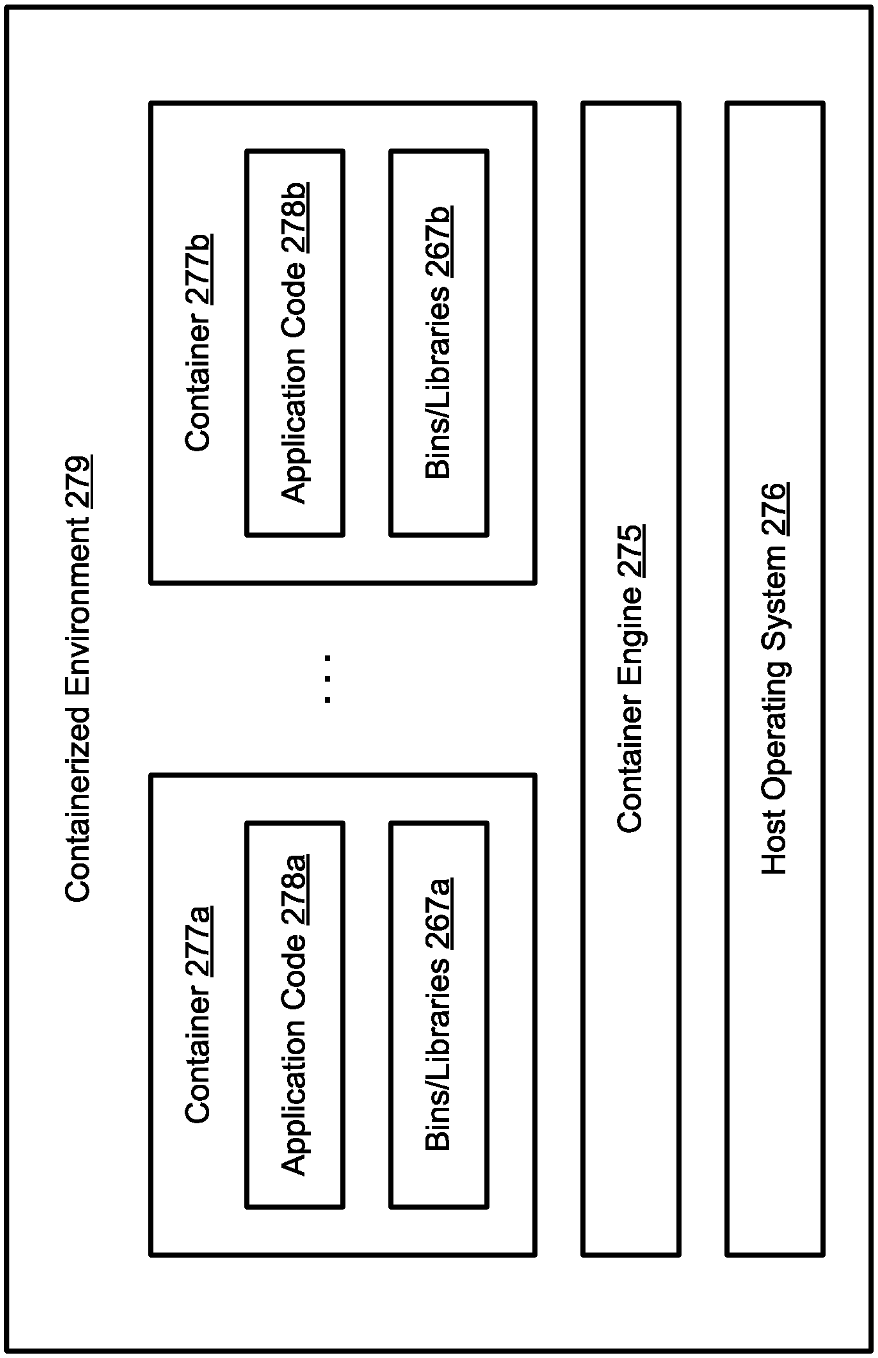
FIG. 2C depicts an embodiment of a containerized environment that includes a container engine running on top of a host operating system.

FIG. 2C depicts an embodiment of a containerized environment 279 that includes a container engine 275 running on top of a host operating system 276. The container engine 275 may manage or run containers **277*a* and 277*b* on the same operating system kernel of the host operating system 276. The container engine 275 may acquire a container image and convert the container image into one or more running processes. In some cases, the container engine 275 may group containers that make up an application into logical units (or pods). A pod may contain one or more containers and all containers in a pod may run on the same node in a cluster. Each container 277 may include application code 278 and application dependencies 267, such as operating system libraries, required to run the application code 278. As depicted, container 277*a* includes application code 278*a* and application dependencies 267*a* and container 277*b* includes application code 278*b* and application dependencies 267*b*. Containers allow portability by encapsulating an application within a single executable package of software that bundles application code 278 together with the related configuration files, binaries, libraries, and dependencies required to run the application code 278. In one embodiment, applications of the user equipment 108 may be executed using the containerized environment 279**. Containerized applications may be used to isolate the containerized applications from other applications installed on the same computing device.

Figures 3A, 3B:
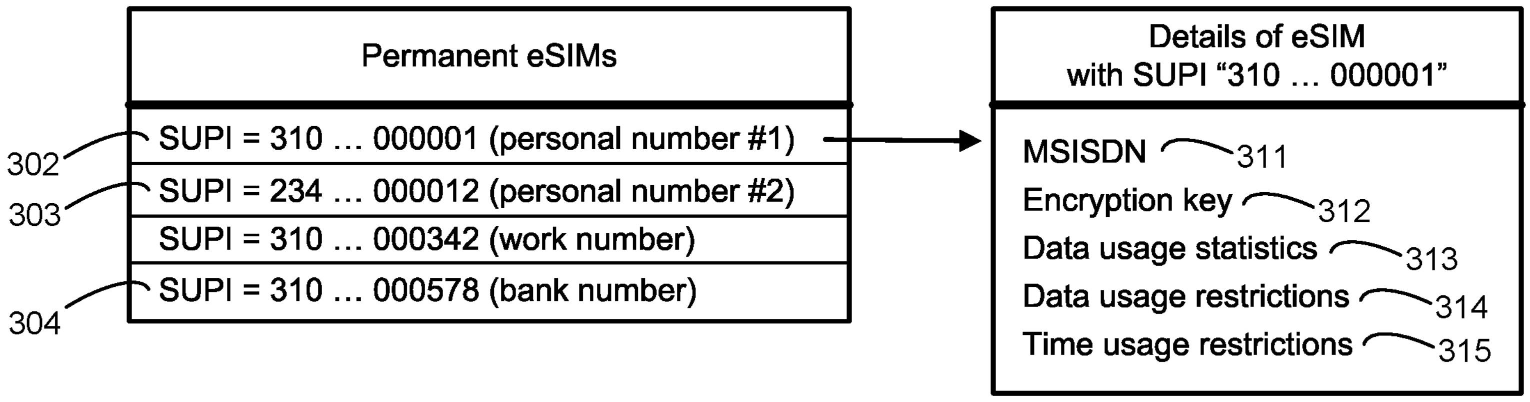
FIG. 3A depicts one embodiment of a set of permanent eSIMs.
FIG. 3B depicts one embodiment of a set of transferable eSIMs.

FIG. 3A depicts one embodiment of a set of permanent eSIMs including eSIMs 302-304. The eSIM 302 corresponds with a Subscription Permanent Identifier (SUPI) of "310 . . . 000001." In some cases, the SUPI may correspond with an International Mobile Subscriber Identity (IMSI). The eSIM 302 may correspond with a personal phone number for use within a first country or region and the eSIM 303 may correspond with a second personal phone number for use within a second country or region. The eSIM 304 may correspond with a third phone number for use with a particular bank; the third phone number may be provided only to the particular bank for multifactor authentication purposes.

As depicted in FIG. 3A, the eSIM 302 maps to MSISDN 311 (e.g., a particular phone number), encryption key 312 (e.g., for encrypting the SUPI for the eSIM 302), data usage statistics 313 (e.g., the aggregated amount of data that has been transferred or received using the eSIM 302), data usage restrictions 314 (e.g., an upper limit on the amount of data that may be transferred or received using the eSIM 302 per month), and time usage restrictions 315 (e.g., an upper limit on the amount of time that the eSIM 302 may be used for establishing and maintaining a wireless connection per month).

FIG. 3B depicts one embodiment of a set of transferable eSIMs including transferable eSIMs 322-324. Each eSIM of the set of transferable eSIMs may be transferred to a computing device (e.g., to a child's mobile phone) to enable the computing device to establish a wireless network connection with a wireless network to which the eSIM has been registered. In some cases, each eSIM of the set of transferable eSIMs may be stored within a database, such as the eSIM database 144 in FIG. 1A, and may be selectively loaded into an eUICC or deleted from the eUICC by an eSIM manager, such as the eSIM manager 142 in FIG. 1A. Each eSIM of the set of transferable eSIMs may map to a particular mobile number (or a particular MSISDN), an upper limit for the number of calls that may be supported by the eSIM, an upper limit on the amount of time that the eSIM may be used to establish or maintain a wireless connection with a wireless network, an upper limit on the amount of data usage for the wireless connection, and a renewable identifier that specifies whether the usage restrictions for the eSIM may be renewed on a periodic basis (e.g., may be renewed every month or every year). In one example, the eSIM 324 may have a data usage limit of 1 GB per month with the data usage limit being reset to 1 GB every month. Thus, after the data usage limit has been reset for the eSIM 324, the eSIM 324 may be loaded into an eUICC to establish a wireless cellular connection. The eSIMs that are not identified as being renewable are not able to establish wireless network connections after their usage limits have been exceeded. An additional transferrable eSIM may be acquired from a wireless network (e.g., from an HSS for the wireless network after registration of the eSIM) and added to the open slot 325 for the set of transferable eSIMs.

Figure 3C:
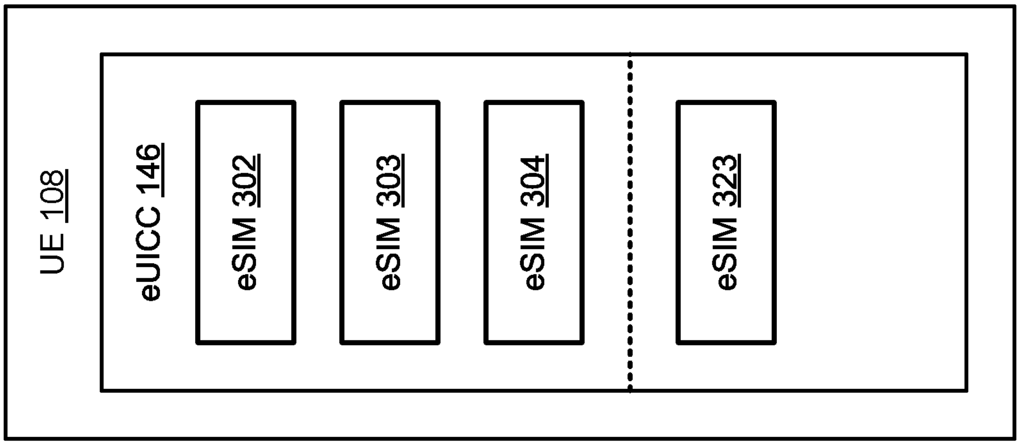
FIG. 3C depicts one embodiment of user equipment at a first point in time.

FIG. 3C depicts one embodiment of UE 108 at a first point in time. At the first point in time, the eUICC 146 for the UE 108 implements eSIMs 302-304 and 323. The eSIM 323 may have been added to the eUICC 146 by an eSIM manager, such as the eSIM manager 142 in FIG. 1A, in response to detection that a call from a new or unknown phone number was received or in response to detection that an end user of the UE 108 has selected that a temporary eSIM be activated (e.g., the end user may manually select that the temporary eSIM be loaded into the eUICC 146 prior to calling a taxi service).

Figure 3D:
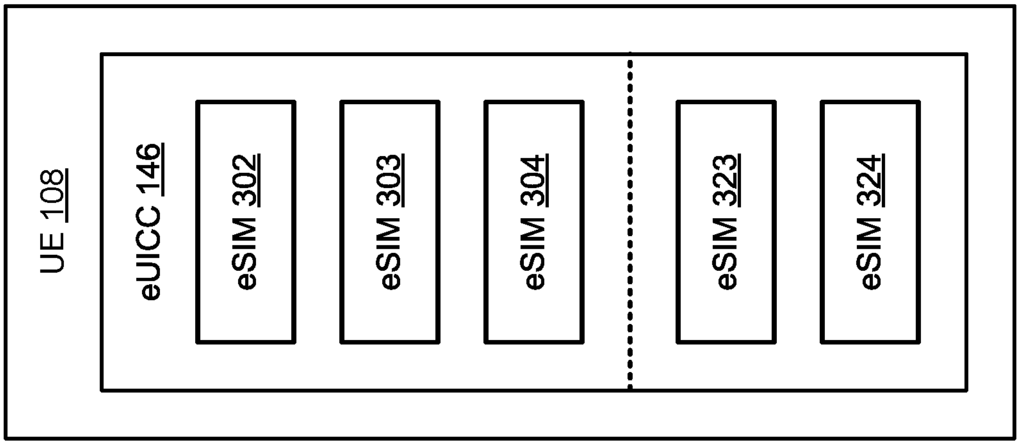
FIG. 3D depicts one embodiment of user equipment at a second point in time subsequent to the first point in time.

FIG. 3D depicts one embodiment of UE 108 at a second point in time subsequent to the first point in time depicted in FIG. 3C. At the second point in time, the eUICC 146 for the UE 108 implements eSIM 324 in addition to the eSIMs 302-304 and 323. In one embodiment, the eSIM 324 may be loaded into the eUICC 146 in response to detection that a call to an unknown phone number has been initiated by an end user of the UE 108. In this case, upon detection that the end user of the UE 108 has initiated the call to the unknown phone number, the UE 108 may automatically load the eSIM 324 into the eUICC 146 and use the eSIM 324 to make the call to the unknown phone number. An unknown phone number may comprise a phone number that the UE 108 does not recognize as existing within a contacts list or that is being called for the first time using the UE 108.

Figure 3E:
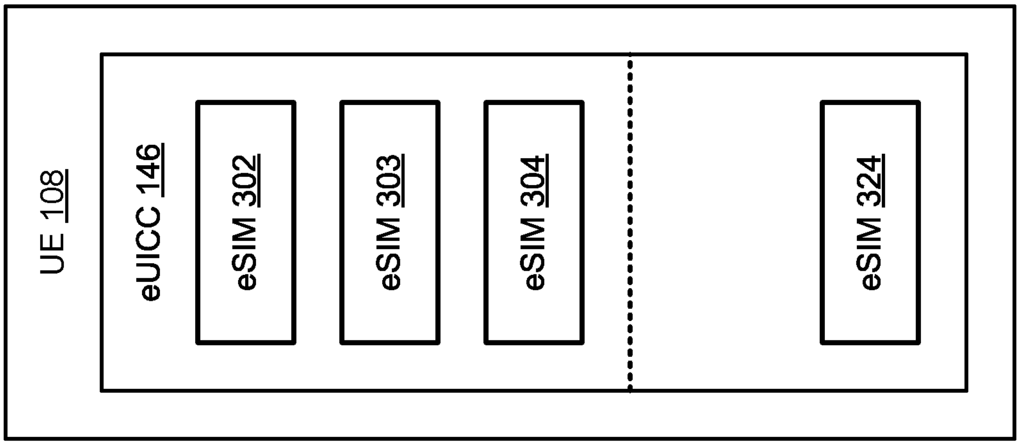
FIG. 3E depicts one embodiment of user equipment at a third point in time subsequent to the second point in time.

FIG. 3E depicts one embodiment of UE 108 at a third point in time subsequent to the second point in time depicted in FIG. 3D. At the third point in time, the eUICC 146 for the UE 108 implements eSIMs 302-304 and 324. In this case, the eSIM 323 may have exceeded a time or data usage limitation prior to the third point in time and has been removed from the eUICC 146.

Figure 3F:
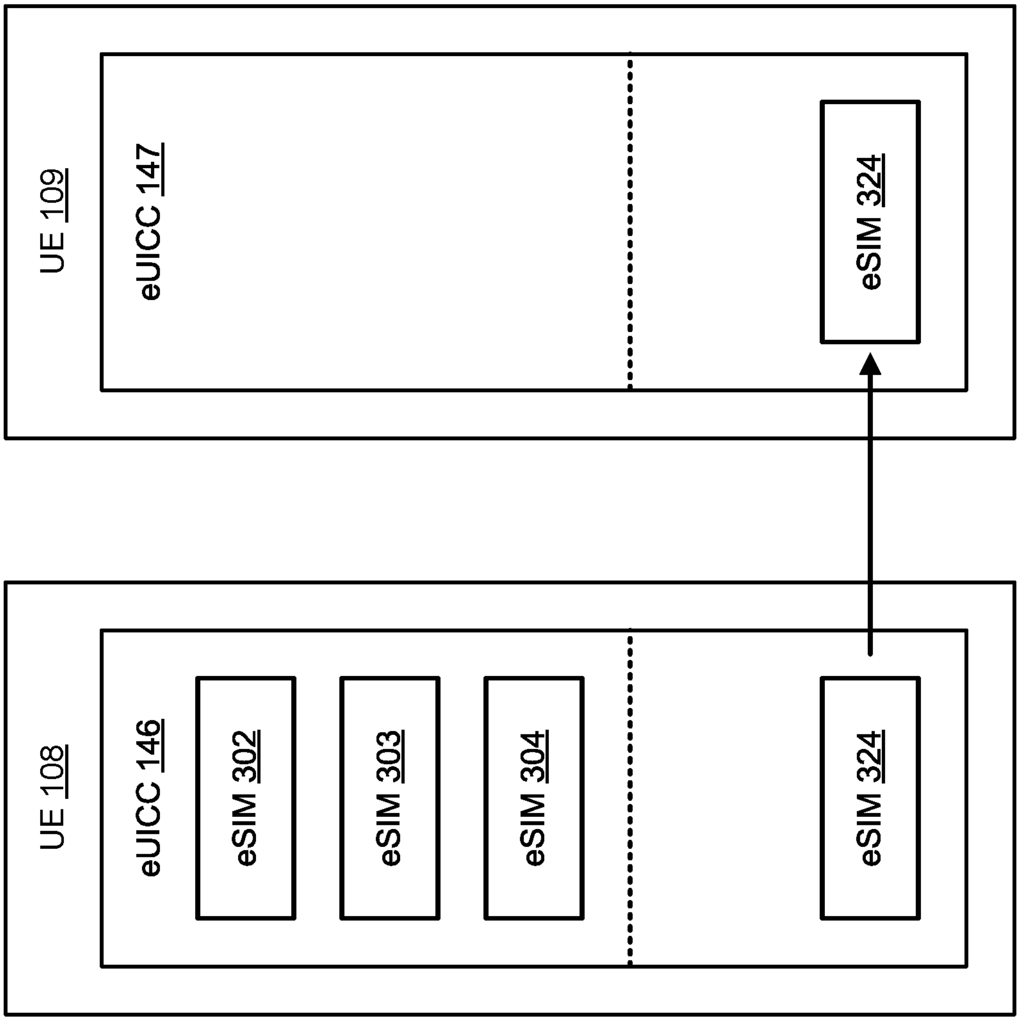
FIG. 3F depicts one embodiment of user equipment transferring an eSIM to a computing device.

FIG. 3F depicts one embodiment of UE 108 transferring the eSIM 324 to the UE 109, such as after the third point in time depicted in FIG. 3E. In this case, the eSIM 324 comprises a transferable eSIM that may be transferred to another computing device such as UE 109 in order to allow the other computing device to establish or maintain a wireless connection using the eSIM 324. The UE 108 may transfer the eSIM 324 and its corresponding phone number to the UE 109 by performing a wireless file transfer or embedding the eSIM 324 within an electronic message. The UE 109 may load the eSIM 324 into the eUICC 147.

Figure 4A:
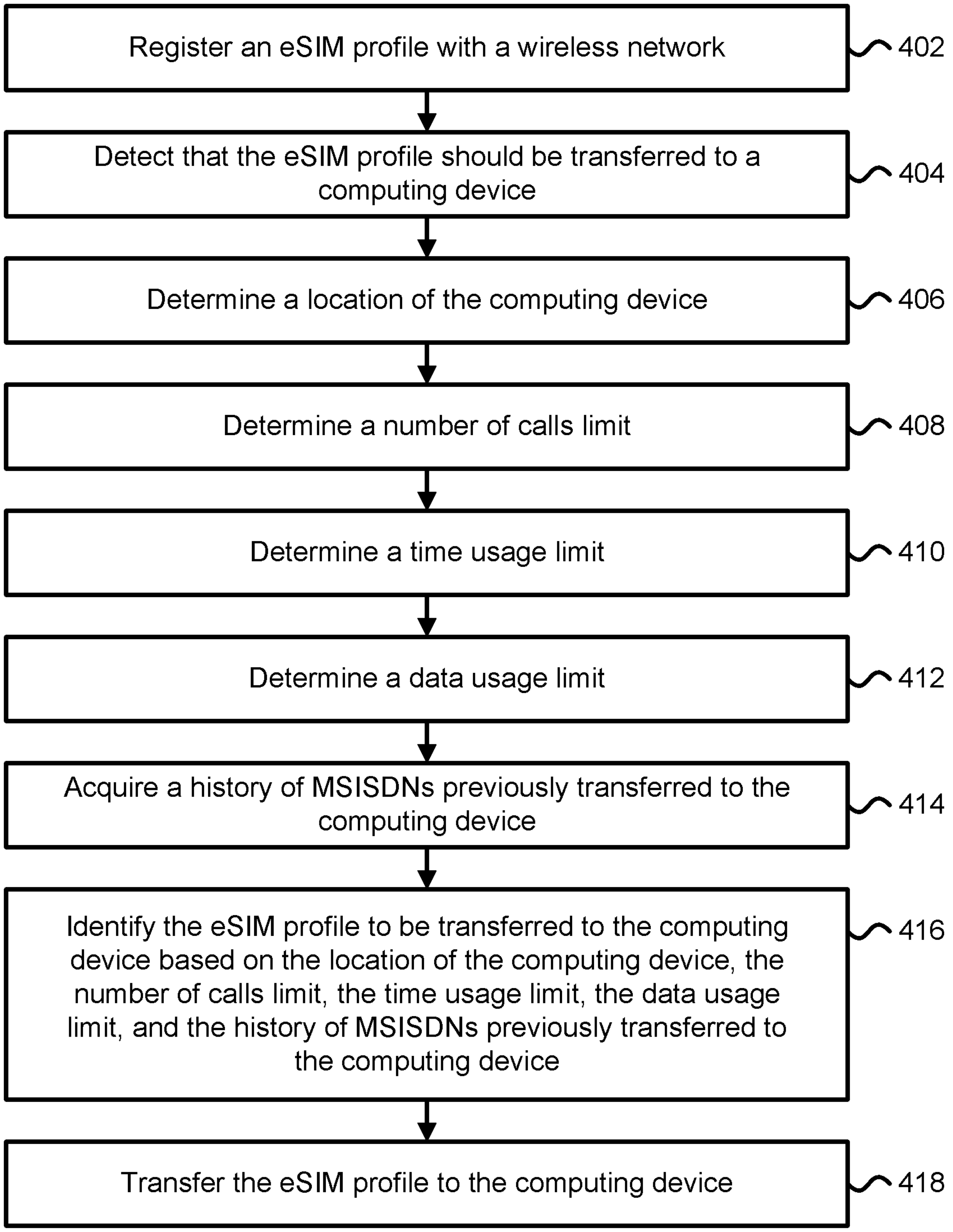
FIG. 4A depicts a flowchart describing an embodiment of a process for transferring temporary wireless service to a computing device.

FIG. 4A depicts a flowchart describing an embodiment of a process for transferring temporary wireless service to a computing device. The temporary wireless service may correspond with a secondary service plan that depends on a primary service plan used by a different computing device. In one embodiment, the process of FIG. 4A may be performed using one or more real or virtual machines and/or one or more containerized applications. In another embodiment, the process of FIG. 4A or portions thereof may be performed using a containerized environment, such as the containerized environment 279 in FIG. 2C. In another embodiment, the process of FIG. 4A or portions thereof may be performed using an eSIM manager, such as the eSIM manager 142 in FIG. 1A, an eSIM database, such as the eSIM database 144 in FIG. 1A, and/or an eUICC, such as the eUICC 146 in FIG. 1A.

In step 402, an eSIM profile is registered with a wireless network. In one example, the eSIM profile may be registered with the network 102 in FIG. 1A. After registration, the eSIM profile may allow user equipment, such as UE 108 in FIG. 1A, to establish a wireless network connection (e.g., a wireless cellular connection) with the wireless network. In step 404, it is detected that the eSIM profile should be transferred to a computing device, such as another UE (e.g., UE 109 in FIG. 3F). In one embodiment, it may be detected that the eSIM profile should be transferred to the computing device in response to an end user selection to make the transfer.

In some cases, after registration, the eSIM profile may have been transferred to a parent device, such as UE 108 in FIG. 3F, and stored in an eSIM database of the parent device, such as the eSIM database 144 in FIG. 1A. The parent device need not load the eSIM profile into its eUICC; instead, the parent device may store a large number of eSIM profiles for transfer to subsequent children devices. When the parent device subsequently transfers the eSIM profile to a child device, such as UE 109 in FIG. 3F, the child device may load the eSIM profile into an eUICC of the child device, such as the eUICC 147 of UE 109 in FIG. 3F.

In step 406, a location of the computing device is determined. In one example, the location of the computing device may correspond with a GPS location of the computing device. In step 408, a number of calls limit is determined. The number of calls limit may set an upper bound to the number of calls that may be made using the eSIM profile. In step 410, a time usage limit is determined. The time usage limit may set an upper bound to the amount of time that the eSIM profile may be used to establish or maintain a connection to the wireless network. In step 412, a data usage limit is determined. The data usage limit may set an upper bound to the amount of data that the eSIM profile may be used for transmitting and/or receiving data.

In some embodiments, the determination of the number of calls limit, the time usage limit, and the data usage limit may be made prior to registration of the eSIM profile and requested by an end user of a parent device during registration of the eSIM profile with the wireless network. In one example, a parent device may register fifty different eSIM profiles with the wireless network, with each of the fifty eSIM profiles associated with a different phone number and assigned a maximum data usage limit and a maximum time usage limit. The parent device may initially store the fifty eSIM profiles in an eSIM database located on the parent device and may selectively load one of the fifty eSIM profiles into an eUICC of the parent device or transfer one of the fifty eSIM profiles to a child device.

In step 414, a history of MSISDNs (or a history of phone numbers) previously transferred to the computing device (e.g., the MSISDNs associated with eSIM profiles that were previously transferred to the computing device) is acquired. In step 416, the eSIM profile to be transferred to the computing device is identified based on the location of the computing device, the number of calls limit, the time usage limit, the data usage limit, and the history of MSISDNs previously transferred to the computing device. In step 418, the eSIM profile is transferred to the computing device. In one example, the computing device may correspond with the UE 109 in FIG. 3F.

In one embodiment, the eSIM profile to be transferred to the computing device is identified as the transferable eSIM profile within an eSIM database, such as the eSIM database 144, that is located within a particular geographical region and has the largest data usage limit. In another embodiment, the eSIM profile to be transferred to the computing device is identified as the transferable eSIM profile within an eSIM database that has at least a threshold time usage limit and does not have an MSISDN that is duplicative of another MSISDN that was previously transferred to the computing device. In another embodiment, the eSIM profile to be transferred to the computing device is identified as the transferable eSIM profile within an eSIM database that does not correspond with a phone number that was previously used by the computing device and that has the highest time usage limit out of the eSIM profiles stored within the eSIM database.

Figure 4B:
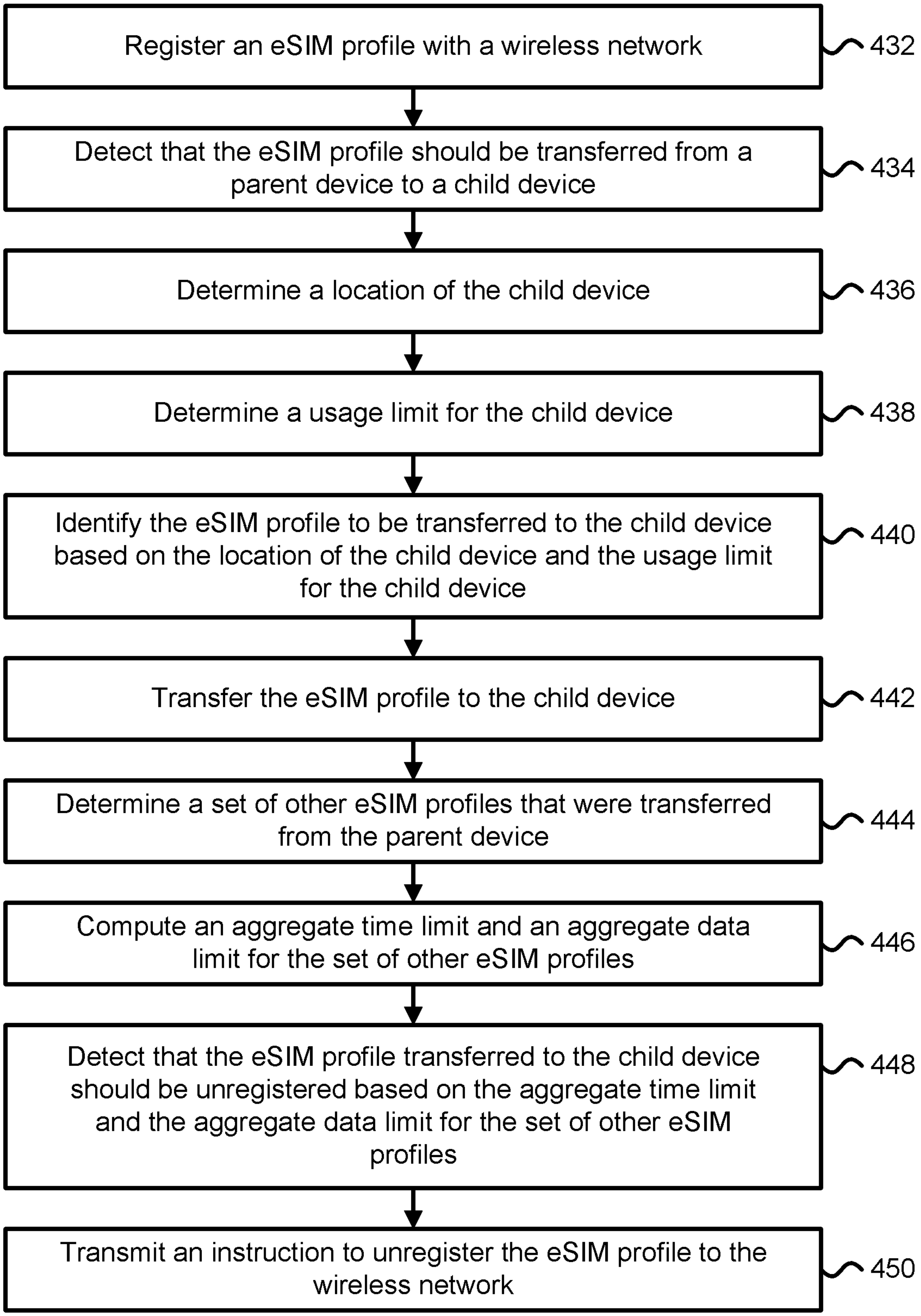
FIG. 4B depicts a flowchart describing another embodiment of a process for transferring temporary wireless service to a computing device.

FIG. 4B depicts a flowchart describing another embodiment of a process for transferring temporary wireless service to a computing device. The temporary wireless service may correspond with a secondary service plan that depends on a primary service plan used by a different computing device. In one embodiment, the process of FIG. 4B may be performed using one or more real or virtual machines and/or one or more containerized applications. In another embodiment, the process of FIG. 4B or portions thereof may be performed using a containerized environment, such as the containerized environment 279 in FIG. 2C. In another embodiment, the process of FIG. 4B or portions thereof may be performed using an eSIM manager, such as the eSIM manager 142 in FIG. 1A, an eSIM database, such as the eSIM database 144 in FIG. 1A, and/or an eUICC, such as the eUICC 146 in FIG. 1A.

In step 432, an eSIM profile is registered with a wireless network. In step 434, it is detected that the eSIM profile should be transferred from a parent device to a child device. In one example, the parent device may correspond with the UE 108 in FIG. 3F and the child device may correspond with the UE 109 in FIG. 3F. In step 436, a location of the child device is determined. The location of the child device may correspond with a GPS location of the child device. In step 438, a usage limit for the child device is determined. The usage limit for the child device may comprise one of a time usage limit or a data usage limit. The usage limit may correspond with a particular usage metric, such as a maximum time usage limit or a maximum data usage limit.

In step 440, the eSIM profile to be transferred to the child device is identified based on the location of the child device and the usage limit for the child device. In one example, the location of the child device may dictate a subset of eSIM profiles that are able to provide wireless connectivity for the child device at the location of the child device. The eSIM profile may be selected from the subset of eSIM profiles that are able to provide wireless connectivity for the child device at the location of the child device with the most restrictive usage limit, such as the smallest data usage limit or the smallest time usage limit.

In step 442, the eSIM profile is transferred to the child device. In step 444, a set of other eSIM profiles that were transferred from the parent device is determined. In step 446, an aggregate time limit and an aggregate data limit for the set of other eSIM profiles are computed using usage statistics for the set of other eSIM profiles. In step 448, it is detected that the eSIM profile transferred to the child device should be unregistered based on the aggregate time limit and/or the aggregate data limit for the set of other eSIM profiles. In this case, upon the eSIM profile being unregistered with the wireless network, the child device will be unable to connect to the wireless network using the unregistered eSIM profile.

In step 450, an instruction to unregister the eSIM profile is transmitted to the wireless network. In one example, the instruction to unregistered the eSIM profile may be transmitted to the wireless network in response to detecting that the aggregate time limit has exceeded a maximum time limit or that the aggregate data limit has exceeded a maximum data limit.

Figure 5A:
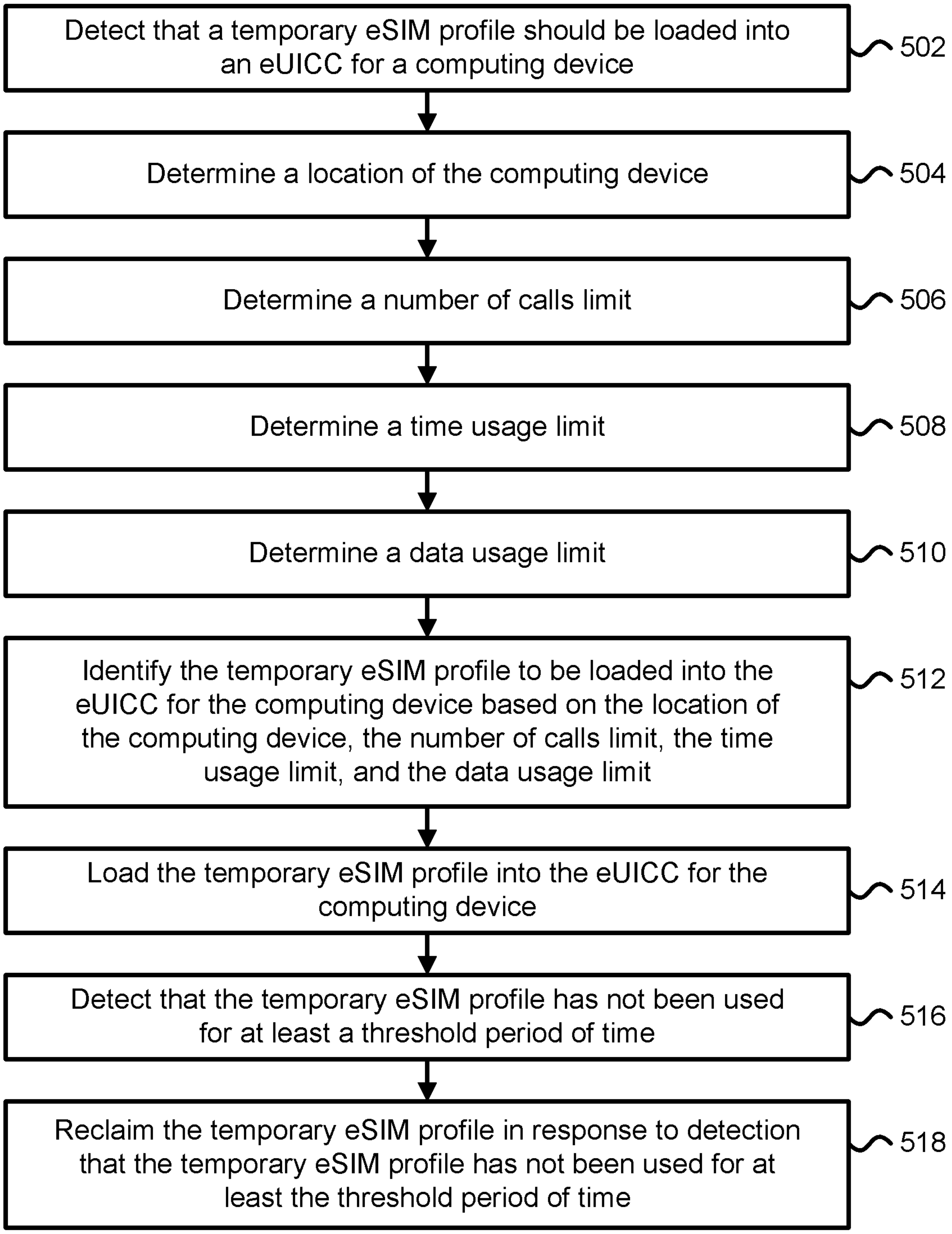
FIG. 5A depicts a flowchart describing an embodiment of a process for managing the use of temporary eSIM profiles for establishing temporary wireless services.

FIG. 5A depicts a flowchart describing an embodiment of a process for managing the use of temporary eSIM profiles for establishing temporary wireless services. In one embodiment, the process of FIG. 5A may be performed using one or more real or virtual machines and/or one or more containerized applications. In another embodiment, the process of FIG. 5A or portions thereof may be performed using a containerized environment, such as the containerized environment 279 in FIG. 2C. In another embodiment, the process of FIG. 5A or portions thereof may be performed using an eSIM manager, such as the eSIM manager 142 in FIG. 1A, an eSIM database, such as the eSIM database 144 in FIG. 1A, and/or an eUICC, such as the eUICC 146 in FIG. 1A.

In step 502, it is detected that a temporary eSIM profile should be loaded into an eUICC for a computing device. The temporary eSIM profile may have been stored within an eSIM database and transferred to the eUICC by an eSIM manager, such as the eSIM manager 142 in FIG. 1A. The eSIM manager may load an eSIM profile into the eUICC for the computing device by writing data associated with the eSIM profile to a memory (e.g., a semiconductor memory) of the eUICC.

In some embodiments, it is detected that the temporary eSIM profile should be loaded into the eUICC for the computing device in response to detection that a call from a particular phone number has been received at the computing device. The particular phone number may not be associated with a username or a user profile stored on the computing device. In this case, the temporary eSIM profile may be preloaded in the event that an end user of the computing device initiates a call to the particular phone number. In some embodiments, it is detected that the temporary eSIM profile should be loaded into the eUICC for the computing device in response to detection that a call to the particular phone number has been initiated. In this case, the temporary eSIM profile may be loaded into the eUICC for the computing device prior to making the call to the particular phone number and the call to the particular phone number may be made using the temporary eSIM profile. In some cases, it is detected that a temporary eSIM profile should be loaded into an eUICC for the computing device in response to detection that a call to a known phone number has been initiated. In this case, a call initiated to a known phone number associated with a username or a user profile stored on the computing device may be made using the temporary eSIM profile.

In step 504, a location of the computing device is determined. The location of the computing device may correspond with a region in which the computing device is located. In one embodiment, the location of the computing device may correspond with an area code and a temporary eSIM profile used for making a call may be identified due to having a phone number with the same area code. In step 506, a number of calls limit is determined. In step 508, a time usage limit is determined. In step 510, a data usage limit is determined.

In step 512, the temporary eSIM profile to be loaded into the eUICC for the computing device is identified based on the location of the computing device, the number of calls limit, the time usage limit, and the data usage limit. In step 514, the temporary eSIM profile is loaded into the eUICC for the computing device. The eUICC may correspond with the eUICC 146 in FIG. 1A and the temporary eSIM profile may correspond with the eSIM 148 in FIG. 1A. The temporary eSIM profile may be loaded into the eUICC for the computing device by writing data associated with the temporary eSIM profile into a memory of the eUICC.

In step 516, it is detected that the temporary eSIM profile has not been used for at least a threshold period of time (e.g., has not been used for at least two weeks). In step 518, the temporary eSIM profile is reclaimed in response to detection that the temporary eSIM profile has not been used for at least the threshold period of time. In one embodiment, the temporary eSIM profile may be reclaimed by deleting or removing the temporary eSIM profile from the eUICC for the computing device. The temporary eSIM profile may still exist within an eSIM database of the computing device and therefore may be reloaded into the eUICC at a later time. In some cases, a temporary eSIM profile may persist or be stored within an eSIM database of the computing device until the temporary eSIM profile has been unregistered or until the temporary eSIM profile expires due to a number of call limit or a usage limit being exceeded.

Figure 5B:
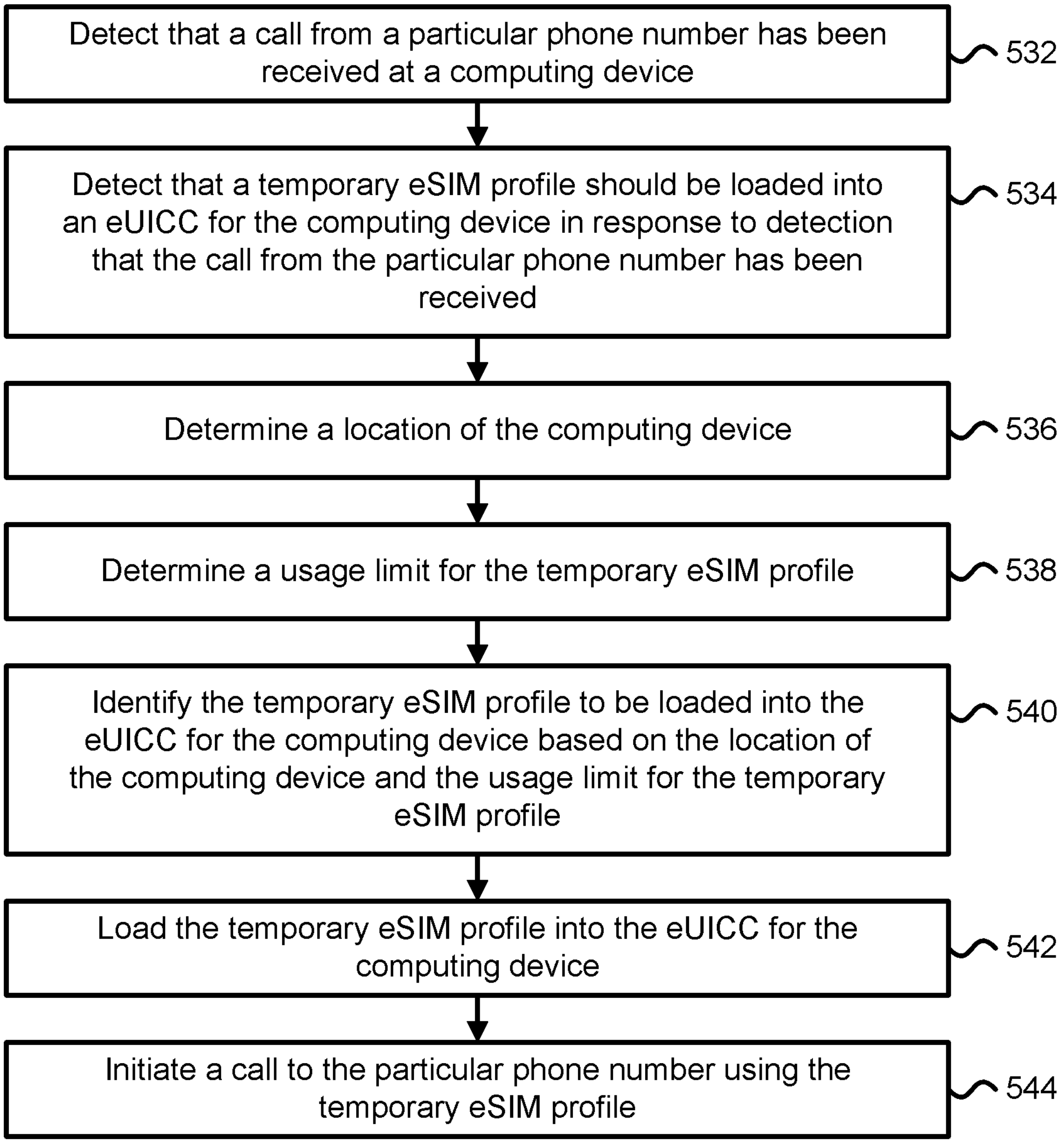
FIG. 5B depicts a flowchart describing another embodiment of a process for managing the use of temporary eSIM profiles for establishing temporary wireless services.

FIG. 5B depicts a flowchart describing another embodiment of a process for managing the use of temporary eSIM profiles for establishing temporary wireless services. In one embodiment, the process of FIG. 5B may be performed using one or more real or virtual machines and/or one or more containerized applications. In another embodiment, the process of FIG. 5B or portions thereof may be performed using a containerized environment, such as the containerized environment 279 in FIG. 2C. In another embodiment, the process of FIG. 5B or portions thereof may be performed using an eSIM manager, such as the eSIM manager 142 in FIG. 1A, an eSIM database, such as the eSIM database 144 in FIG. 1A, and/or an eUICC, such as the eUICC 146 in FIG. 1A.

In step 532, it is detected that a call from a particular phone number has been received at a computing device. In step 534, it is detected that a temporary eSIM profile should be loaded into an eUICC for the computing device in response to detection that the call from the particular phone number has been received. In some cases, it is detected that a temporary eSIM profile should be loaded into an eUICC for the computing device in response to detection that a call to the particular phone number has been initiated. In step 536, a location of the computing device is determined. The location the computing device may correspond with a GPS location of the computing device. In step 538, a usage limit for the temporary eSIM profile is determined. In step 540, the temporary eSIM profile to be loaded into the eUICC for the computing device is identified based on the location of the computing device and the usage limit for the temporary eSIM profile. In step 542, the temporary eSIM profile is loaded into the eUICC for the computing device. In step 544, a call to the particular phone number is initiated using the temporary eSIM profile.

At least one embodiment of the disclosed technology includes one or more processors configured to detect that an eSIM profile associated with a secondary service plan that depends on a primary service plan should be transferred to a computing device, determine a location of the computing device, identify the eSIM profile from a set of eSIM profiles based on the location of the computing device, and cause the eSIM profile to be transferred to the computing device. In some cases, the one or more processors may be configured to detect that the eSIM profile should be transferred from a first computing device to the computing device, the secondary service plan depends on the primary service plan used by the first computing device.

At least one embodiment of the disclosed technology includes registering an eSIM profile with a wireless network. The eSIM profile is associated with a secondary service plan that depends on a primary service plan used by a first computing device. The method further comprises detecting that the eSIM profile should be transferred to a second computing device, determining a location of the second computing device, identifying the eSIM profile from a plurality of eSIM profiles based on the location of the second computing device, and transferring the eSIM profile from the first computing device to the second computing device.

In some cases, the method further comprises acquiring a history of phone numbers that were previously used by the second computing device and identifying the eSIM profile from the plurality of eSIM profiles based on the history of phone numbers that were previously used by the second computing device.

The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more." and "and/or." as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A first computing device, comprising:

one or more processors configured to:

detect that an eSIM profile should be transferred from the first computing device to a second computing device;

determine a geographical location of the second computing device;

acquire a history of Mobile Station International Subscriber Directory Numbers that were previously used by the second computing device;

identify a particular eSIM profile from a set of eSIM profiles based on the geographical location of the second computing device and on the history Mobile Station International Subscriber Directory Numbers that were previously used by the second computing device, wherein the particular eSIM profile enables the second computing device to temporarily use a primary service plan of the first computing device; and cause the particular eSIM profile to be transferred from the first computing device to the second computing device.

2. The first computing device of claim 1, wherein:

the one or more processors cause the particular eSIM profile to be transferred from the first computing device to the second computing device by being further configured to:

cause the particular eSIM profile to be transferred to the second computing device via a QR code.

3. The first computing device of claim 2, wherein:

the QR code comprises a dynamic QR code that directs the second computing device to a web address to download the particular eSIM profile.

4. The first computing device of claim 1, wherein:

the one or more processors cause the particular eSIM profile to be transferred from the first computing device to the second computing device by being further configured to cause the particular eSIM profile to be transferred to the second computing device via an electronic message transmitted to the second computing device.

5. The first computing device of claim 1, further comprising:

a memory that stores an eSIM database that includes the set of eSIM profiles, each profile of the set of eSIM profiles allows temporary use of the primary service plan for a particular period of time.

6. The first computing device of claim 1, wherein:

the primary service plan allows the first computing device to establish a wireless network connection to a wireless network and the particular eSIM profile allows the second computing device to establish a second wireless network connection to the wireless network via the primary service plan.

7. The first computing device of claim 6, wherein:

the particular eSIM profile allows the second computing device to access the wireless network until a particular usage metric has been satisfied.

8. The first computing device of claim 7, wherein:

the particular usage metric comprises one of a data usage limit or a time usage limit.

9. The first computing device of claim 1, wherein:

each profile of the set of eSIM profiles was previously registered with a wireless network prior to identification of the particular eSIM profile from the set of eSIM profiles.

10. The first computing device of claim 1, wherein:

the one or more processors are configured to determine a time usage limit for the secondary service plan and identify the particular eSIM profile from the set of eSIM profiles based on the time usage limit.

11. The first computing device of claim 1, wherein:

the one or more processors are configured to determine a data usage limit for the second computing device and identify the particular eSIM profile from the set of eSIM profiles based on the data usage limit.

12. The first computing device of claim 1, wherein:

the one or more processors are configured to acquire a history of phone numbers that correspond to the history of Mobile Station International Subscriber Directory Numbers that were previously used by the second computing device and identify the particular eSIM profile from the set of eSIM profiles based on the history of phone numbers that were previously used by the second computing device.

13. The first computing device of claim 12, wherein:

the particular eSIM profile is associated with a phone number that is not duplicative of another phone number that was previously used by the second computing device.

14. The first computing device of claim 1, wherein:

the one or more processors are configured to determine a set of other eSIM profiles that were transferred to the second computing device, determine an aggregate data usage for the set of other eSIM profiles, and transmit an instruction to unregister the particular eSIM profile in response to detection that the aggregate data usage for the set of other eSIM profiles has exceeded a threshold data usage.

15. A method, comprising:

registering an eSIM profile with a wireless network, the eSIM profile enables another computing device to temporarily use a primary service plan used by a first computing device;

detecting that the eSIM profile should be transferred to a second computing device;

determining a geographic location of the second computing device;

acquiring a history of phone numbers that were previously used by the second computing device;

identifying the eSIM profile from a plurality of eSIM profiles based on the geographic location of the second computing device and based on the history of phone numbers that were previously used by the second computing device; and transferring the eSIM profile from the first computing device to the second computing device.

16. A system, comprising:

a second computing device in communication with a wireless network via a second wireless network connection; and a first computing device in communication with the wireless network via a first wireless network connection, the first computing device configured to detect that an eSIM profile should be transferred from the first computing device to the second computing device and determine a geographic location of the second computing device, the first computing device configured to identify the eSIM profile from a plurality of eSIM profiles that corresponds to a phone number usable in the geographic location of the second computing device, wherein each of the plurality of eSIM profiles corresponds to a different phone number usable in different geographic locations, and transfer the eSIM profile from the first computing device to the second computing device, the eSIM profile enables the second computing device to temporarily establish the second wireless network connection by using a primary service plan used by the first computing device to establish the first wireless network connection.

* * * * *